United States Patent
Shellhammer et al.

(10) Patent No.: US 9,525,540 B1
(45) Date of Patent: Dec. 20, 2016

(54) EMBEDDED WAKE-UP SIGNALING

(71) Applicant: QUALCOMM Incorporated, San Diego, CA (US)

(72) Inventors: Stephen Jay Shellhammer, Ramona, CA (US); Peter Pui Lok Ang, San Diego, CA (US); Joseph Patrick Burke, Glenview, IL (US); Tingfang Ji, San Diego, CA (US); Cong Nguyen, San Diego, CA (US); Joseph Binamira Soriaga, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/017,500

(22) Filed: Feb. 5, 2016

Related U.S. Application Data

(60) Provisional application No. 62/181,635, filed on Jun. 18, 2015.

(51) Int. Cl.
*H04L 7/00* (2006.01)
*H04L 5/00* (2006.01)
(Continued)

(52) U.S. Cl.
CPC ......... *H04L 7/0012* (2013.01); *H04L 5/0007* (2013.01); *H04L 7/043* (2013.01); *H04L 27/04* (2013.01); *H04W 40/005* (2013.01)

(58) Field of Classification Search
USPC ............... 375/260, 324; 370/311, 210, 328
See application file for complete search history.

(56) References Cited

U.S. PATENT DOCUMENTS

2005/0063331 A1* 3/2005 Kim ............... H04W 52/0235 370/328
2010/0118692 A1* 5/2010 Wakutsu .......... H04W 52/0235 370/210

(Continued)

FOREIGN PATENT DOCUMENTS

WO WO-2007035447 A2 3/2007

OTHER PUBLICATIONS

International Search Report and Written Opinion—PCT/US2016/033598—ISA/EPO—Sep. 20, 2016.

(Continued)

*Primary Examiner* — Eva Puente
(74) *Attorney, Agent, or Firm* — Haynes and Boone, LLP

(57) ABSTRACT

When embedding a signal into a selected subcarrier of a multicarrier downlink waveform of regular data/control signaling, a base station modulates the embedded signal with a different modulation scheme than the other data in the downlink waveform. The base station nulls adjacent subcarriers to minimize interference at a low-power wake-up receiver of an IOE device(s). The IOE device wakes up the low-power wake-up receiver at scheduled times to listen for the signal. For synchronization signals, the IOE device corrects a local clock based on a correlation value of the signal to a predetermined sequence. For wake-up signals, the IOE device correlates whatever is detected at the antenna to a predetermined sequence and compares the correlation value to a predetermined threshold. If the threshold is met, the IOE device registers a wake-up signal and wakes the primary transceiver of the device. If not, the receiver goes back to sleep.

30 Claims, 12 Drawing Sheets

(51) Int. Cl.
*H04W 40/00* (2009.01)
*H04L 27/04* (2006.01)
*H04L 7/04* (2006.01)

(56) References Cited

U.S. PATENT DOCUMENTS

| | | | |
|---|---|---|---|
| 2010/0214969 A1* | 8/2010 | Lamm | H04W 52/0216 370/311 |
| 2014/0112226 A1 | 4/2014 | Jafarian et al. | |
| 2014/0112229 A1 | 4/2014 | Merlin et al. | |
| 2014/0120962 A1 | 5/2014 | Merlin et al. | |
| 2014/0126442 A1 | 5/2014 | Jafarian et al. | |
| 2014/0169502 A1* | 6/2014 | Lovell | H04L 5/0007 375/324 |
| 2014/0211678 A1 | 7/2014 | Jafarian et al. | |
| 2014/0269462 A1 | 9/2014 | Jia et al. | |

OTHER PUBLICATIONS

Metal P.N., "A 52 W Wake-Up Receiver with 72 dBm Sensitivity Using an Uncertain-IF Architecture", IEEE Journal of Solid-State Circuits, IEEE Service Center, Piscataway, NJ, USA, vol. 44, No. 1, Jan. 1, 2009 (Jan. 1, 2009), pp. 269-280, XP011241053, ISSN: 0018-9200, DOI: 10.1109/JSSC.2008.2007438.

Tsai S.S., et al., "Wake-up Signal for 802.16m OFDMA Idle Mode; C80216m-07 217r1", IEEE Draft, C80216M-07 217R1, IEEE-SA, Piscataway, NJ USA, Vol. 802.16m, No. r1, Nov. 8, 2007 (Nov. 8, 2007), pp. 1-8, XP017795838, [retrieved on Nov. 8, 2007].

* cited by examiner

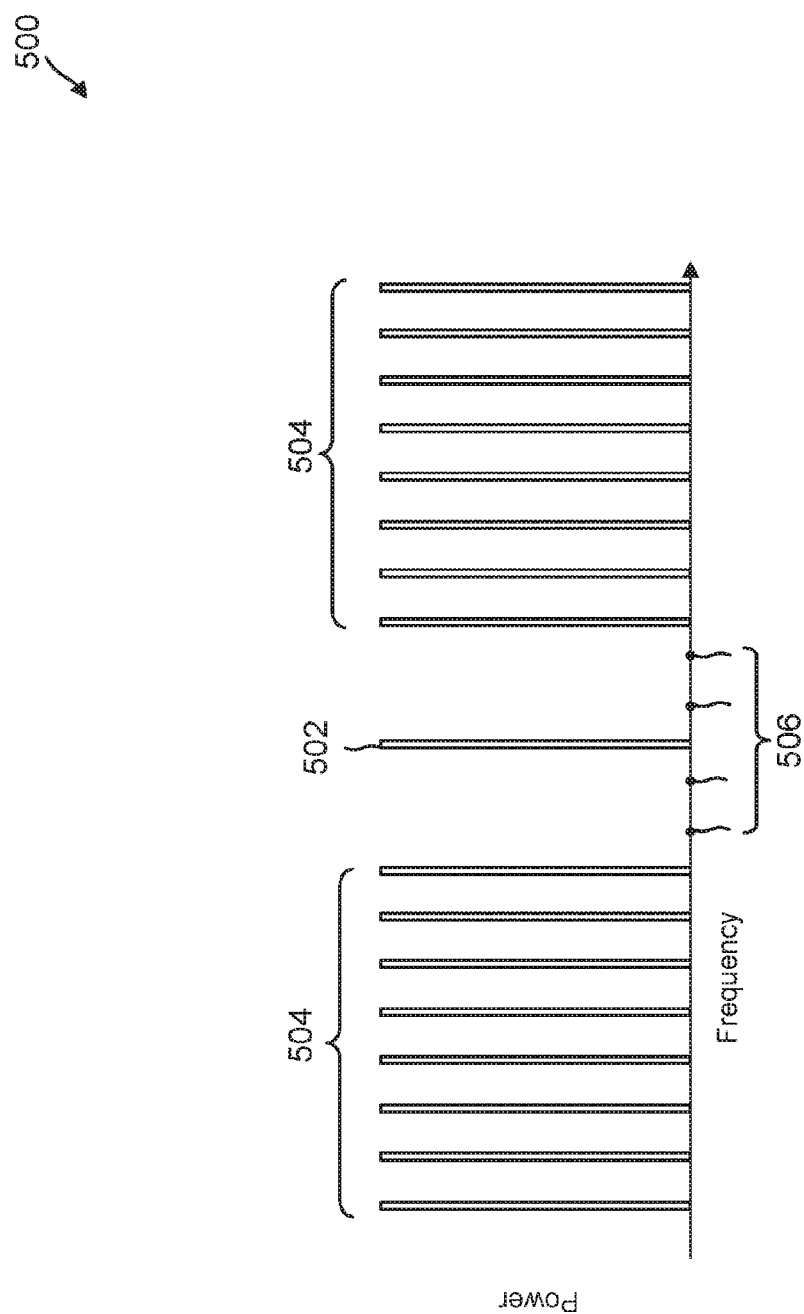

EMBEDDED WAKE-UP SIGNALING

CROSS REFERENCE TO RELATED APPLICATIONS

The present application claims priority to and the benefit of the U.S. Provisional Patent Application No. 62/181,635, filed Jun. 18, 2015, which is hereby incorporated by reference in its entirety.

TECHNICAL FIELD

This application relates to wireless communication systems, and more particularly to enabling a low-power "internet of everything" (IOE) device to utilize a secondary low-power receiver while not requiring additional transmit circuitry at a transmitting base station.

INTRODUCTION

Sensors that can link to other sensors and computer systems continue to be embedded with more and more devices or objects, resulting in the "internet of everything" (also referred to as the "internet of things"), using a variety of wired and/or wireless communication technologies. The growth in connectivity results in machine-to-machine (M2M) communication without human intervention. Some examples of integration include devices that integrate sensors or meters to capture information that is then relayed to a remote system, such as a central server, via a base station. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, remote security sensing, physical access control, transaction-based business charging, and other applications.

Given their nature, IOE devices are typically designed to consume low amounts of power and have low cost. For example, an IOE device, such as including a sensor, deployed in a gas meter (resulting in a "smart meter") may be expected to last years without replacement or recharge (if recharging is possible). In contrast, a user equipment (UE), such as a mobile device, has significantly more transmit power that, together with other features of the given UE, consume enough power that the UE is expected to be recharged every few days, if not daily or more frequently. Typically, these IOE devices are designed to periodically wake up to deliver their data to a central server.

Further, it occasionally is desirable or necessary for the central server, or other device, to communicate with the IOE devices at times where the IOE devices are not scheduled to transmit data to the server. To enable this, the base station may transmit periodic wake-up signals to instruct one or more IOE devices to wake up to receive and/or transmit data. This has required the base station to include additional transmit circuitry, beyond the transmit circuitry used to transmit other data messages, to transmit specific wake-up signals to one or more of the IOE devices.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes identifying, by a first communications device, at least one subcarrier within an orthogonal frequency division multiplexing (OFUM) downlink signal for use in communicating with a wake-up receiver of a second communications device while a primary receiver of the second communications device is in deep sleep. The method also includes inserting, by the first communications device, an embedded signal into the identified at least one subcarrier at one or more pre-specified times for transmission to the wake-up receiver of the second communications device. The method further includes transmitting, from the first communications device, the embedded signal to the wake-up receiver of the second communications device with a first modulation using the identified at least one subcarrier, the first modulation being different from a second modulation used in transmitting data with one or more remaining subcarriers in the OFUM downlink signal.

In an additional aspect of the disclosure, a method for wireless communication includes waking up a wake-up receiver of a first communications device, while a primary receiver of the first communications device is in deep sleep, at a pre-determined time to listen for an embedded signal within at least one selected subcarrier in an orthogonal frequency multiplexing (OFDM) downlink signal from a second communications device. The method also includes detecting a signal at the wake-up receiver at the at least one selected subcarrier during the pre-determined time. The method further includes determining whether the detected signal is the embedded signal having a first modulation from the second communications device and intended for the first communications device, the first modulation being different from a second modulation used in transmitting data with one or more remaining subcarriers in the OFDM downlink signal.

In an additional aspect of the disclosure, a wireless communications device includes a processor configured to identify at least one subcarrier within an orthogonal frequency division multiplexing (OFDM) downlink signal for use in communicating with a wake-up receiver of a second wireless communications device while a primary receiver of the second wireless communications device is in deep sleep. The processor is further configured to insert an embedded signal into the identified at least one subcarrier at one or more pre-specified times for transmission to the wake-up receiver of the second communications device. The wireless communications device also includes a transceiver configured to transmit the embedded signal to the wake-up receiver of the second wireless communications device with a first modulation using the identified at least one subcarrier, the first modulation being different from a second modulation used in transmitting data with one or more remaining subcarriers in the OFDM downlink signal.

In an additional aspect of the disclosure, a wireless communications device includes a primary receiver configured to enter deep sleep. The wireless communications device also includes a wake-up receiver configured to wake up, while the primary receiver is in deep sleep, at a pre-determined time to listen for an embedded signal intended for the wireless communications device within at least one selected subcarrier in an orthogonal frequency multiplexing (OFDM) downlink signal from a second wireless communications device. The wake-up receiver is further configured to detect a signal at the at least one selected subcarrier during the pre-determined time. The wake-up receiver is also configured to determine whether the detected signal is the embedded signal having a first modulation from the second wireless communications device, the first modulation being different from a second modulation used in transmitting data with one or more remaining subcarriers in the OFDM downlink signal.

In an additional aspect of the disclosure, a computer-readable medium having program code recorded thereon includes program code comprising code for causing a first communications device to identify at least one subcarrier within an orthogonal frequency division multiplexing (OFDM) downlink signal for use in communicating with a wake-up receiver of a second communications device while a primary receiver of the second communications device is in deep sleep. The program code further comprises code for causing the first communications device to insert an embedded signal into the identified at least one subcarrier at one or more pre-specified times for transmission to the wake-up receiver of the second communications device. The program code also comprises code for causing the first communications device to transmit the embedded signal to the wake-up receiver of the second communications device with a first modulation using the identified at least one subcarrier, the first modulation being different from a second modulation used in transmitting data with one or more remaining subcarriers in the OFDM downlink signal.

In an additional aspect of the disclosure, a computer-readable medium having program code recorded thereon includes program code comprising code for causing a first communications device to wake up a wake-up receiver of the first communications device, while a primary receiver of the first communications device is in deep sleep, at a pre-determined time to listen for an embedded signal within at least one selected subcarrier in an orthogonal frequency multiplexing (OFDM) downlink signal from a second communications device. The program code further comprises code for causing the first communications device to detect a signal at the at least one selected subcarrier during the pre-determined time. The program code also comprises code for causing the first communications device to determine whether the detected signal is the embedded signal having a first modulation from the second communications device and intended for the first communications device, the first modulation being different from a second modulation used in transmitting data with one or more remaining subcarriers in the OFDM downlink signal.

In an additional aspect of the disclosure, a wireless communications device includes means for identifying at least one subcarrier within an orthogonal frequency division multiplexing (OFDM) downlink signal for use in communicating with a wake-up receiver of a second wireless communications device while a primary receiver of the second wireless communications device is in deep sleep. The wireless communications device further includes means for inserting an embedded signal into the identified at least one subcarrier at one or more pre-specified times for transmission to the wake-up receiver of the second wireless communications device. The wireless communications device also includes means for transmitting the embedded signal to the wake-up receiver of the second wireless communications device with a first modulation using the identified at least one subcarrier, the first modulation being different from a second modulation used in transmitting data with one or more remaining subcarriers in the OFDM downlink signal.

In an additional aspect of the disclosure, a wireless communications device includes means for waking up a wake-up receiver of the wireless communications device, while a primary receiver of the wireless communications device is in deep sleep, at a pre-determined time to listen for an embedded signal within at least one selected subcarrier in an orthogonal frequency multiplexing (OFDM) downlink signal from a second wireless communications device. The wireless communications device further includes means for detecting a signal at the wake-up receiver at the at least one selected subcarrier during the pre-determined time. The wireless communications device also includes means for determining whether the detected signal is the embedded signal having a first modulation from the second wireless communications device and intended for the wireless communications device, the first modulation being different from a second modulation used in transmitting data with one or more remaining subcarriers in the OFDM downlink signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5A illustrates an exemplary subcarrier chart according to aspects of the present disclosure.

DETAILED DESCRIPTION

Figure 1:
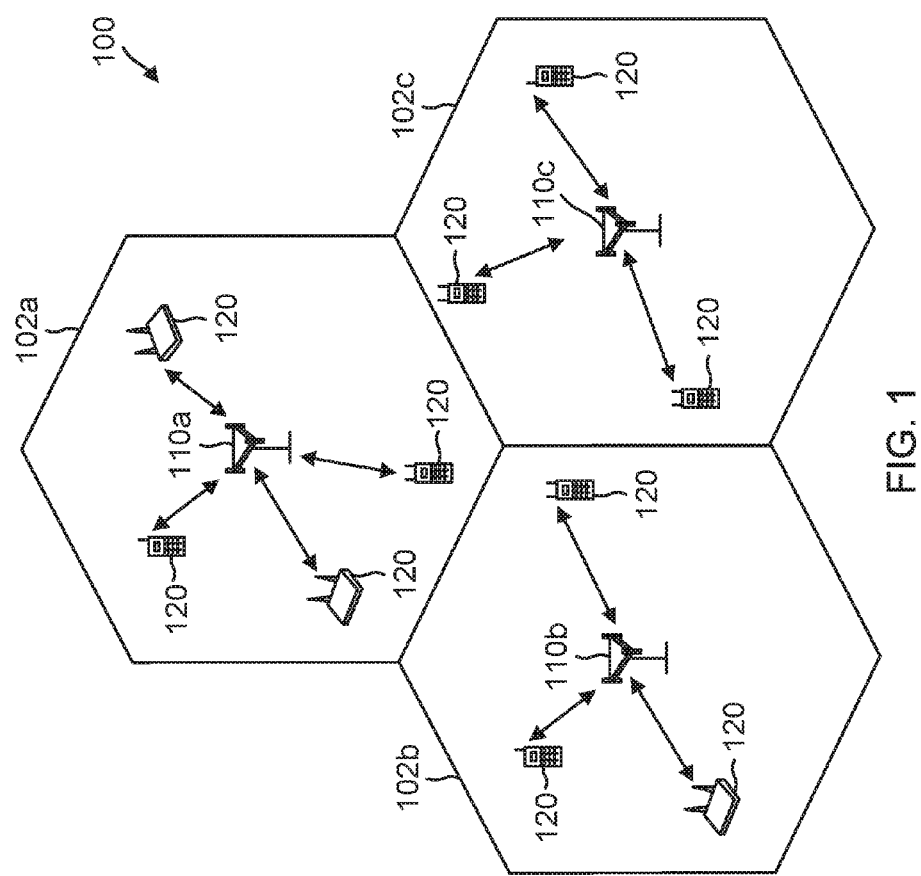
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to embed a synchronization signal or a wake-up signal into a downlink waveform at a base station that is intended for a low-power wake-up receiver of one or more IOE devices (a specific type of UE). As a result, the transmitting base station does not require additional transmit circuitry for the dedicated synchronization or wake-up signals intended for the low-power wake-up receiver of the IOE device.

In an embodiment, a base station may assign time and frequency resource elements at which to embed a synchronization or wake-up signal for transmission to one or more IOE devices into a downlink waveform. Where each IOE device is assigned unique time/frequency resource elements for wake-up signaling, the base station may use the same sequence, such as a pseudo-random noise sequence, for both the synchronization signals and the wake-up signals. Where multiple IOE devices are assigned to shared time/frequency resource elements, the base station may use different sequences for the wake-up signal for each IOE device, such that no IOE device listening at the same time/frequency combination as another IOE device may confuse a wake-up signal directed to the other IOE device as intended for it. When embedding a synchronization signal or wake-up signal into a downlink waveform (e.g., that includes regular data and/or control signaling for one or more other UEs), the base station may modulate the embedded signal according to a different modulation scheme than the other data in the downlink waveform. For example, the data may be modulated according to orthogonal frequency division multiplexing while the embedded signal may be modulated according to on-off keying (OOK). Further, the base station may null out adjacent subcarriers to the embedded signal in order to minimize interference at the low-power wake-up receiver of the intended IOE device(s).

In an embodiment, the IOE devices within range of the base station may enter deep sleep modes and only wake up the low-power wake-up receivers periodically according to information previously specified from the base station. An IOE device may wake up the low-power wake-up receiver to listen at specified times and subcarriers to detect either a synchronization signal or wake-up signal, depending upon the particular scheduled time. When listening for a synchronization signal broadcast from the base station, the IOE device may correlate the received signal to the locally stored copy of the synchronization signal sequence. Depending upon the result of the correlation, the IOE device may correct a local clock to be better aligned with the clock at the base station. When listening for a wake-up signal, the IOE device may correlate whatever information is detected at the antenna to the locally stored copy of the wake-up signal sequence for the IOE device. The resulting correlation value may be compared to a threshold value and, if the threshold is met, the IOE device may determine that the detected information includes the wake-up signal. In response, the IOE device may cause other elements of the IOE device to wake up momentarily so that the primary transceiver may communicate with the base station in a desired manner (e.g., to receive or transmit data such as sensor data). The IOE device may then go back to sleep until the next scheduled time for the wake-up receiver to listen again.

FIG. 1 illustrates a wireless communication network 100, in accordance with various aspects of the present disclosure. The wireless network 100 may include a number of base stations 110. A base station 110 may include an evolved Node B (eNodeB) in the LTE context, for example. A base station may also be referred to as a base transceiver station or an access point. For simplicity of discussion, it will be referred to herein as a base station. It will be recognized that there could be one to many base stations, as well as be an assortment of different types such as macro, pico, and/or femto base stations, and/or other devices that include at least some capabilities of a base station.

The base stations 110 communicate with user equipments (UEs) 120 as shown. For example, as shown in FIG. 1 base station 110a may communication with the UEs 120 that are within the cell 102a, the base station 110b may communicate with the UEs 120 within the cell 102b, and the base station 102c may communicate with the UEs 120 within the cell 102c. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, etc. The wireless communication network 100 is one example of a network to which various aspects of the disclosure apply.

According to aspects of the present disclosure, one or more of the UEs 120 may be "internet of everything" (IOE) devices (and/or "internet of things" (IoT) devices; reference will be made herein generally to IOE devices for simplicity of discussion). These UEs (IOE devices) 120 may either be stand-alone or integrated within other devices. The UEs (IOE devices) 120 may capture information that is then relayed to a remote system, such as via a base station 110. UEs (IOE devices) 120 may have limited power resources because they are integrated with devices or objects, such as to render those devices or objects "smart," and need to be able to operate for long periods of time without replacement or recharge, e.g. days, weeks, months, or years. Each of the UEs (IOE devices) 120 may only awake at predefined time intervals according to a pre-determined schedule order to decrease power consumption at the UEs (IOE devices) 120.

Embodiments of this disclosure are directed to any type of modulation scheme, but orthogonal frequency division multiplexing (OFDM) is used as a representative modulation for regular data transmissions in the downlink to UEs 120. OFDM is a multi-carrier modulation technique that effectively partitions the overall system bandwidth into multiple (K) orthogonal frequency subbands. These subbands may also be referred to as tones, subcarriers, bins, and frequency channels. With OFDM, each subband is associated with a respective subcarrier that may be modulated with data. Up to K modulation symbols may be sent on the K subbands in each OFDM symbol period.

According to aspects of the present disclosure, the base stations 110a-110c may embed synchronization and/or wake-up signaling into OFDM downlink signaling so that separate, dedicated transmission hardware is not necessary at the base stations 110a-110c. A synchronization signal may be a symbol known to both the transmitter and all listening receivers (e.g., UEs (IOE devices) 120) and transmitted using one or more selected subcarriers. A wake-up signal may be a symbol known to both the transmitter and a particular listening receiver (e.g., UEs (IOE devices) 120, where each UE 120 has a particular sequence assigned to it). For an OFDM symbol with K subbands, any number and configuration of subbands may be used for synchronization and/or wake-up signals. For example, one or more selected subcarriers may be used for synchronization signals, the same and/or other subcarriers for wake-up signals, and the remaining subcarriers for transmitting data symbols or control symbols on some or all of the remaining subcarriers (or the remaining subcarriers may not be used at all at times). These synchronization and wake-up signals may be modulated using a different modulation than that used for data/control symbols on any of the other subcarriers (e.g., OOK for embedded signals and QAM for the other data).

The transmission and signaling techniques described herein may be used for a multiple-input multiple-output (MIMO) system. These techniques may be used for an OFDM-based system and for other multi-carrier communication systems. These techniques may also be used with various OFDM subband structures.

For simplicity of discussion, an example is described where the UEs 120 are IOE devices, and are therefore referred to herein as IOE devices 120. It will be recognized that the UEs 120 communicating with a given base station 110 may include a mix of both IOE devices as well as other types of UE such as mobile phones or other types of mobile computers. The base station 110a in cell 102a will be used as an example.

According to embodiments of the present disclosure, the base station 110a may periodically send synchronization signals to the IOE devices 120 that are within the cell 102a. These synchronization signals are used to enable the IOE devices 120 to periodically synchronize their local clocks with the clock of the base station 110a. This often becomes necessary because the clocks of the IOE devices 120 are less accurate due to the low power demands imposed on the IOE devices 120. Thus, over time the clocks for the IOE devices 120 tend to drift relative to the clock of the base station 110a, which tends to be more accurate and stable. Due to the drift, an offset arises between the time at which a receiver of a given IOE device 120 wakes up to listen for a signal from the base station 110a and the time at which the receiver of the given IOE device 120 actually receives the signal from the base station 110a. If the drift becomes large enough, then the given IOE device 120 will no longer be able to decode the signal received from the base station 110a. The synchronization signal provides the information necessary for the IOE devices 120 to re-synchronize to the base station 110a clock.

The synchronization signal may be periodically sent for example at pre-specified time intervals that the IOE devices 120 are made aware of. For example, this may be established at a time of initial setup such as when an IOE device 120 attaches to the network via the base station 110a. Alternatively or in addition, the base station 110a may establish the periodicity of the synchronization signal, as well as what frequency and time at which the synchronization signal will be transmitted, with a command sent to the IOE devices 120 to place them into sleep mode. According to embodiments of the present disclosure, the synchronization signal may be embedded within an OFDM downlink waveform that includes other information (such as data or control information) for one or more other UEs 120. The synchronization signal is broadcast to all IOE devices 120 within the OFDM downlink and is modulated according to a different modulation scheme than that used for rest of the OFDM downlink waveform. The IOE devices 120 within the cell 102a wake up their low-power wake-up receivers at the times that the synchronization signal is broadcast to re-sync to the clock of the base station 110a, as described above.

According to further embodiments of the present disclosure, each IOE device 120 within the cell 102a may be assigned a particular set of resources (e.g., frequency subcarrier(s) and time slot) at which they are to use their wake-up receivers to monitor for a wake-up signal from the base station 110a. The base station 110a may establish the frequency, and time resource elements, as well as the periodicity, at which the wake-up signal will be transmitted with a command sent to the IOE devices 120 to place them into sleep mode. In an embodiment, the base station 110a assigns each IOE 120 within the cell 102a a different time slot and/or frequency subcarrier(s) at which to wake up to listen for a wake-up signal. In an embodiment, where each IOE device 120 listens at a unique frequency subcarrier and/or time slot, the base station 110a may use the same sequence (e.g., a pseudo random noise sequence) as the signal that is modulated for both the synchronization signal and for each wake-up signal to each IOE device 120. In an alternative embodiment, two or more IOE devices 120 within the cell 102a may be assigned to the same frequency and/or time slot. In this embodiment, the base station 110a may use a different sequence for each IOE device 120 that shares the same frequency and/or time slot so that each IOE device 120 is able to discern whether the wake-up signal is intended for them, as will be discussed in further detail below.

Figure 2:
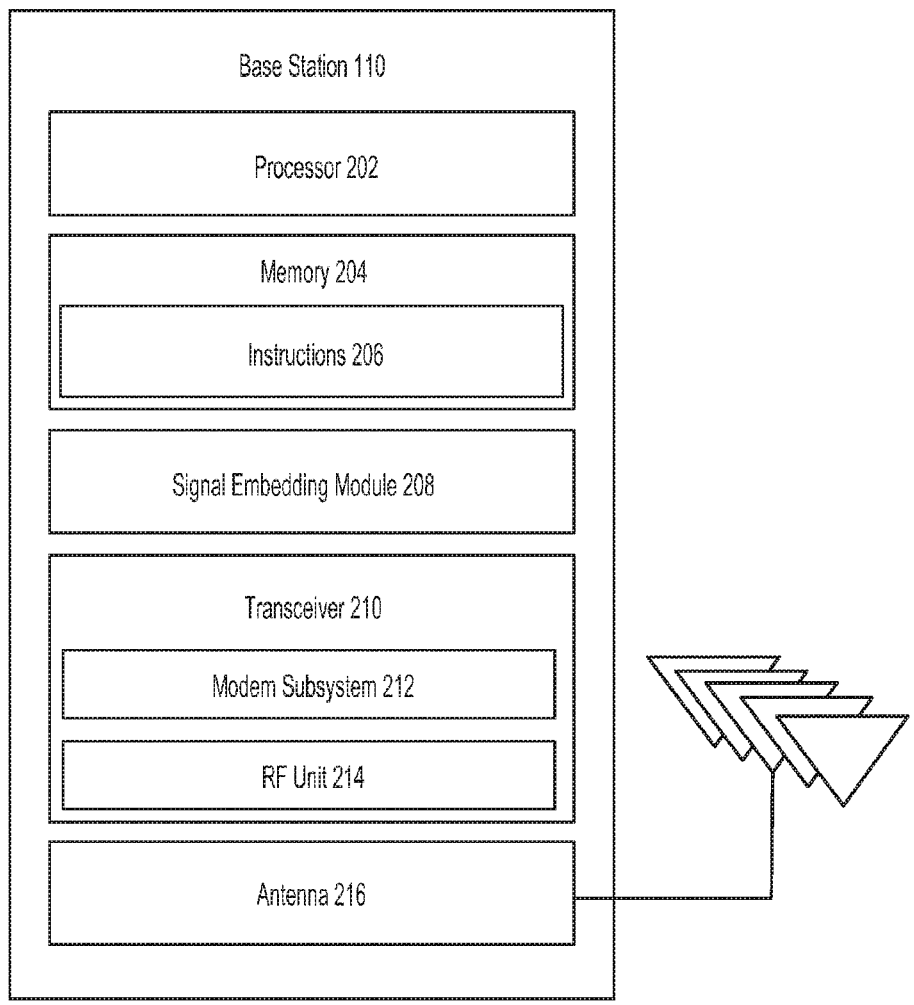
FIG. 2 is a block diagram illustrating an exemplary base station in accordance with various aspects of the present disclosure.

FIG. 2 is a block diagram of an exemplary base station 110 according to embodiments of the present disclosure. The base station 110 may include a processor 202, a memory 204, a signal embedding module 208, a transceiver 210, and an antenna 216. These elements may be in direct or indirect communication with each other, for example via one or more buses. As mentioned above with respect to FIG. 1, the base station 110 may communicate with multiple user equipments (UEs) and/or IOE devices 120 (e.g., smart appliances, hub-type equipment, gateways, serving cells, scheduling entities, set-top boxes, etc.).

The processor 202 may include a CPU, a DSP, an ASIC, a controller, a FPGA device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the base station 110 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The signal embedding module 208 of the base station 110 may be used for various aspects of the present disclosure. For example, the signal embedding module 208 may manage frequency and time resource element assignment/tracking for the devices 120 that are attached to the network through the base station 110 or are otherwise within range. This may be kept within a database on the base station 110, for example. The signal embedding module 208 may include information in a sleep mode message to IOE devices 120 that identifies the assigned time and frequency resource elements that each IOE device 120 has been assigned for wake-up signals and synchronization signals, as well as a periodicity at which the wake-up and synchronization signals will be transmitted from the base station 110.

Figure 4:
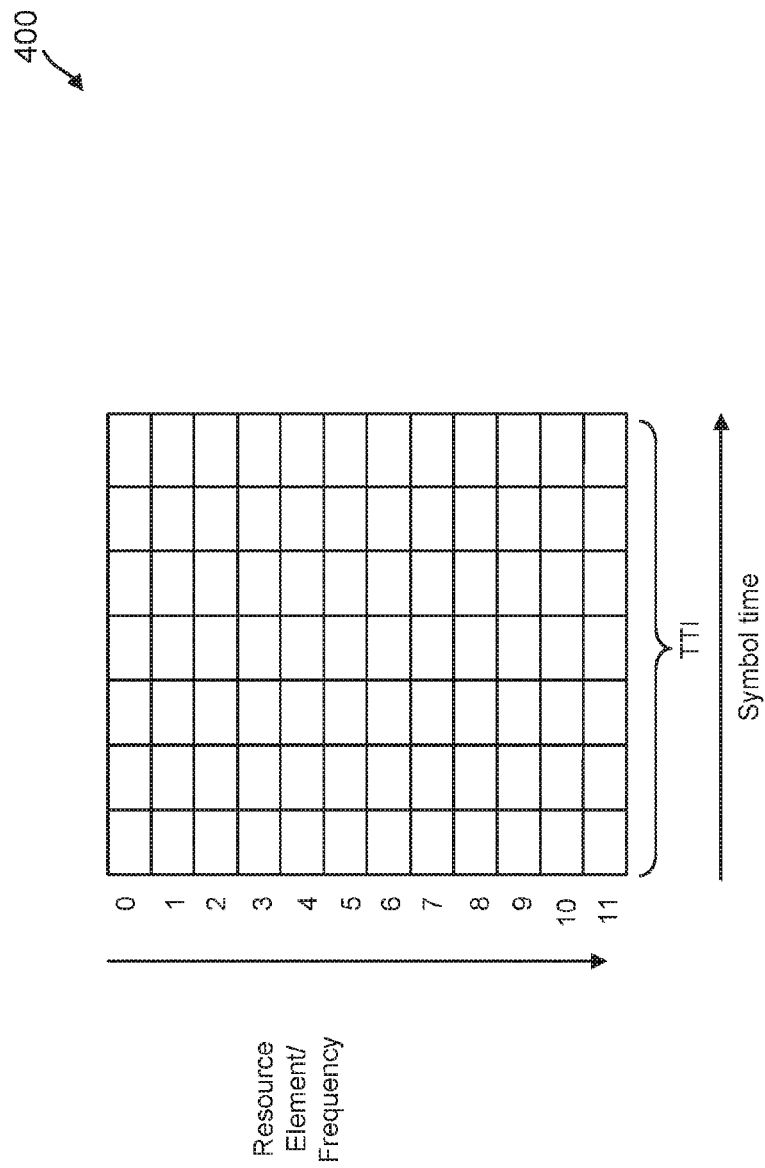
FIG. 4 illustrates an exemplary resource block according to aspects of the present disclosure.

For example, a synchronization signal may be sent once in a given transmission time interval (TTI). FIG. 4 illustrates an exemplary resource block 400 that spans a transmission time interval. As illustrated in FIG. 4, a resource block 400 may include multiple frequency resource elements (12 illustrated in FIG. 4 as one example, though other numbers are possible as well) and multiple symbol time elements. A frequency resource element may be one or more subcarriers for one or more symbols, and a time resource element may be one or more periods of time for one or more symbols. The signal embedding module 208 may be configured to cause one synchronization signal to be broadcast in each TTI, or alternatively multiple according to the design considerations of a given application. The signal embedding module 208 may also be configured to cause one wake-up signal for each IOE device 120 to be transmitted in each TTI, or multiple as will be recognized. In an embodiment, the wake-up signal may be a unicast message, e.g. where the base station 110 seeks to wake up a specific IOE device 120. Alternatively, the wake-up signal may also be a multicast message, for example where the base station 110 seeks to wake up all or a subset of IOE devices 120 that are attached to the base station 110.

Returning to FIG. 2, at the assigned times, the signal embedding module 208 may insert a synchronization signal at the assigned time/frequency into an OFDM downlink waveform that includes data and/or control signaling to a range of devices 120 (e.g., UEs and IOE devices). In addition, the signal embedding module 208 may instruct other components of the base station 110 to null out adjoining subcarriers and/or time resource elements to the time and frequency subcarrier resource element at which the synchronization signal has been inserted. This is illustrated in FIG. 5A, which illustrates an exemplary subcarrier chart 500 according to aspects of the present disclosure.

As shown in FIG. 5A, a synchronization signal (or wake-up signal, as discussed further below) 502 may be embedded and modulated at a selected frequency subcarrier (or set of subcarriers), with adjoining frequency subcarriers 506 being nulled out. Nulling out the adjoining frequency subcarriers involves modulating those subcarriers 506 with zero amplitude. The subcarriers modulated with zero amplitude may also be referred to as guard tones. This is useful since some of the very low-power wake-up receivers at IOE devices 120 may have poorer selectivity than the higher-power primary transceivers at the same IOE devices 120 (e.g., OFDM receivers). Some or all of the remaining frequency resource elements 504 in the subcarrier chart 500 may include data or control signaling modulated with a different modulation than that used for the signal 502. Although illustrated in FIG. 5 as being at the relative center of the OFDM waveform, the subcarrier used for the embedded synchronization (or wake-up) signal 502 may be placed at other subcarriers of the spectrum for the OFDM waveform. Nulling out one or more adjoining subcarriers may help in minimizing interference at the low-power wake-up receivers of the IOE devices 120, which may have poor selectivity.

Figure 5B:
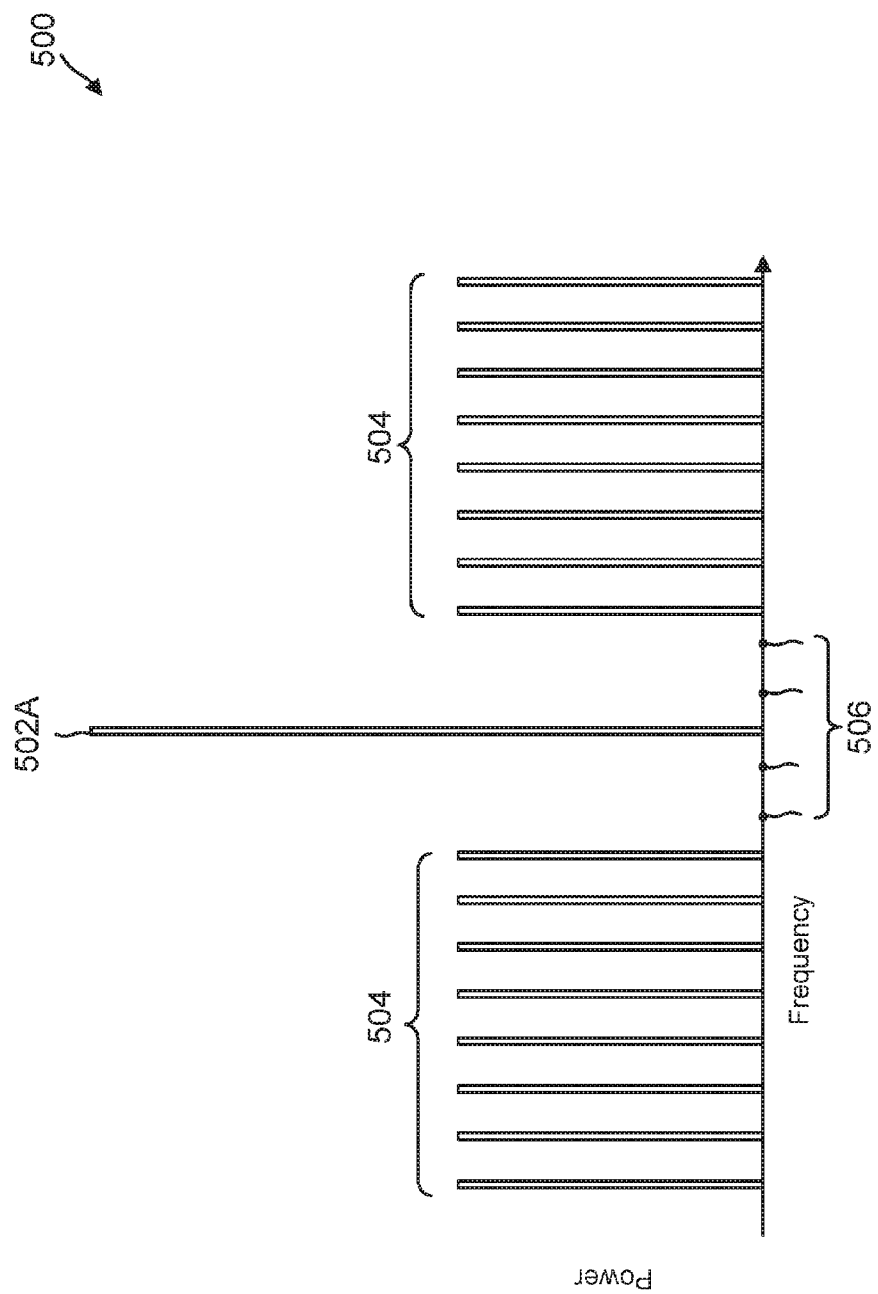
FIG. 5B illustrates an exemplary subcarrier chart according to aspects of the present disclosure.

FIG. 5A illustrates the signal 502 as having relatively the same power at the selected subcarrier as the rest of the OFDM waveform. Alternatively, the power of the signal 502 may be increased relative to the power used for the remaining resource elements 504, which is illustrated in FIG. 5B as signal 502A. Since several of the 01-DM subcarriers 506 are set to null, it is possible to increase the power of the signal 502A at the selected subcarrier used for the synchronization and wake-up signals, while still maintaining the same total transmit power. For example, if four subcarriers are nulled (as illustrated in FIG. 5B for ease of illustration only) the subcarrier used for the synchronization and wake-up signals 502A can be boosted (at least, and in some embodiments more or less) to a power level multiple times the power of the other subcarriers (e.g., 5 times), since the power not used on the nulled subcarriers 506 can be allocated to this subcarrier for the signal 502A. Although four subcarriers 506 are illustrated as nulled in FIGS. 5A and 5B, it will be recognized that any number of adjoining subcarriers may be nulled (including none). Continuing with this example, making the signal 502A multiple times the power of the other subcarriers 504 corresponds to approximately a 7 dB power (as example only) boost on that subcarrier used for the signal 502A. By allocating more power to the subcarrier for the signal 502A, the link budget between the base station 110 and any given low-power IOE device 120 may be improved, resulting in an increase in the coverage of this wake-up signaling.

Returning to FIG. 2, the synchronization signal may be broadcast according to a pre-defined schedule, e.g. periodic time intervals, and all of the IOE devices 120 within range may be assigned to wake up their low-power wake-up receivers at the same time of the broadcast in order to synchronize their clocks to the base station 110.

The synchronization signal may be composed of a sequence. For example, the sequence may be a maximal length pseudo random noise (PN) sequence, which is a sequence of ones and zeros whose autocorrelation function approximates an impulse function. At the wake-up receiver of the IOE devices 120, the received synchronization signal may be detected and correlated to a local copy of the sequence previously shared with the IOE devices 120. When correlating the received synchronization signal to this pre-shared maximal length sequence, the correlator of an IOE device 120 may see a strong correlation when the received synchronization signal is properly time aligned. This allows the low-power wake-up receiver of the IOE devices 120 to correct its clock offset to be time aligned with the clock of the base station 110.

Further, at different assigned times the signal embedding module 208 may insert a wake-up signal into an OFDM downlink waveform that includes data and/or control signaling. The signal embedding module 208 may similarly instruct components of the base station 110 to null out adjoining subcarriers and/or time resource elements to the time and frequency subcarrier resource element at which the wake-up signal has been inserted. The signal embedding module 208 may further instruct the transceiver 210 to modulate the embedded wake-up signal with a modulation that is different than the modulation used for the data/control signaling in the rest of the OFDM downlink waveform, similar to the synchronization signal. The wake-up signal may be transmitted according to a pre-defined schedule, e.g. periodic time intervals that do not overlap with the synchronization signals.

Figure 6A:
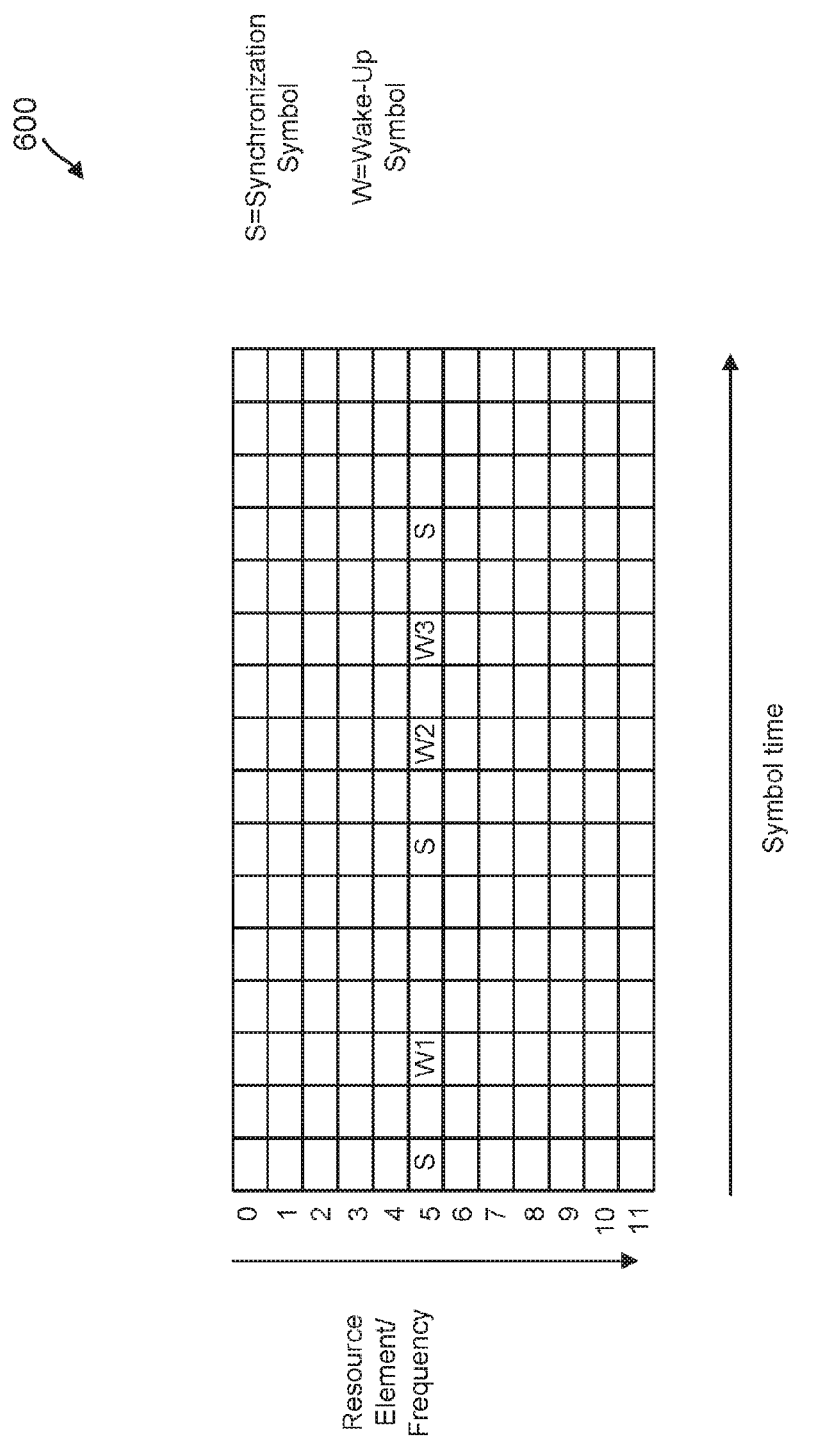
FIG. 6A illustrates an exemplary resource element allocation scheme for synchronization and wake-up signaling according to aspects of the present disclosure.

In an embodiment, the signal embedding module 208 may assign each IOE device 120 a different time and frequency subcarrier resource element at which to receive a wake-up signal, as illustrated in FIG. 6A. All the low-power IOE devices 120 may have their wake-up receiver listen at the same assigned time and frequency for the synchronization signal S, so it can be shared by all the low-power IOE devices 120.

As illustrated in FIG. 6A, a first IOE device 120 may be assigned a first time and frequency resource element at which to listen for a wake-up signal W1 intended for the first IOE device 120. Further, a second IOE device 120 may be assigned a second time and frequency resource element to listen for a wake-up signal W2, a third IOE device 120 may be assigned a third time and frequency resource element to listen for a wake-up signal W3, and so on for additional IOE devices 120 within range of the base station 110. As illustrated in FIG. 6A, the base station 110 may assign each IOE device 120 to a different time slot but to the same frequency subcarrier. This is illustrated as the $5^{th}$ subcarrier in FIG. 6A, though as will be recognized this may be any given subcarrier within the available frequency range. Thus, in FIG. 6A a synchronization signal S may be transmitted at a first time element at the assigned subcarrier, a wake-up signal W1 may be transmitted at a second time element at the same assigned subcarrier, a wake-up signal W2 may be transmitted at a third time element at the same assigned subcarrier, and the wake-up signal W3 may be transmitted at a fourth time element at the same assigned subcarrier.

In the illustrated embodiment of FIG. 6A, the synchronization signal is sent multiple times with the wake-up signals W1, W2, and W3 interspersed throughout. As described above with respect to FIG. 4, each synchronization signal S may represent the start of a new TTI. Alternatively, the synchronization signals S may be assigned a shorter periodicity so that multiple synchronization signals S are sent in one TTI and the wake-up signals for the different IOE devices 120 are transmitted in the same TTI. The periodicity of the synchronization signals S and the wake-up signals W depends upon the power constraints and latency requirements of a given situation. As the latency increases, the power consumption at the IOE devices 120 decreases as the low-power wake-up receivers wake up less frequently to listen for either the synchronization signals S or the wake-up signals W. In contrast, as the latency decreases (corresponding to quicker response times), the power consumption increases as the wake-up receivers wake up more frequently to listen for synchronization signals S and wake-up signals W. The latency is with respect to how quickly a desired IOE device 120 responds to a request to wake up the primary transceiver of the IOE device 120.

Figure 6B:
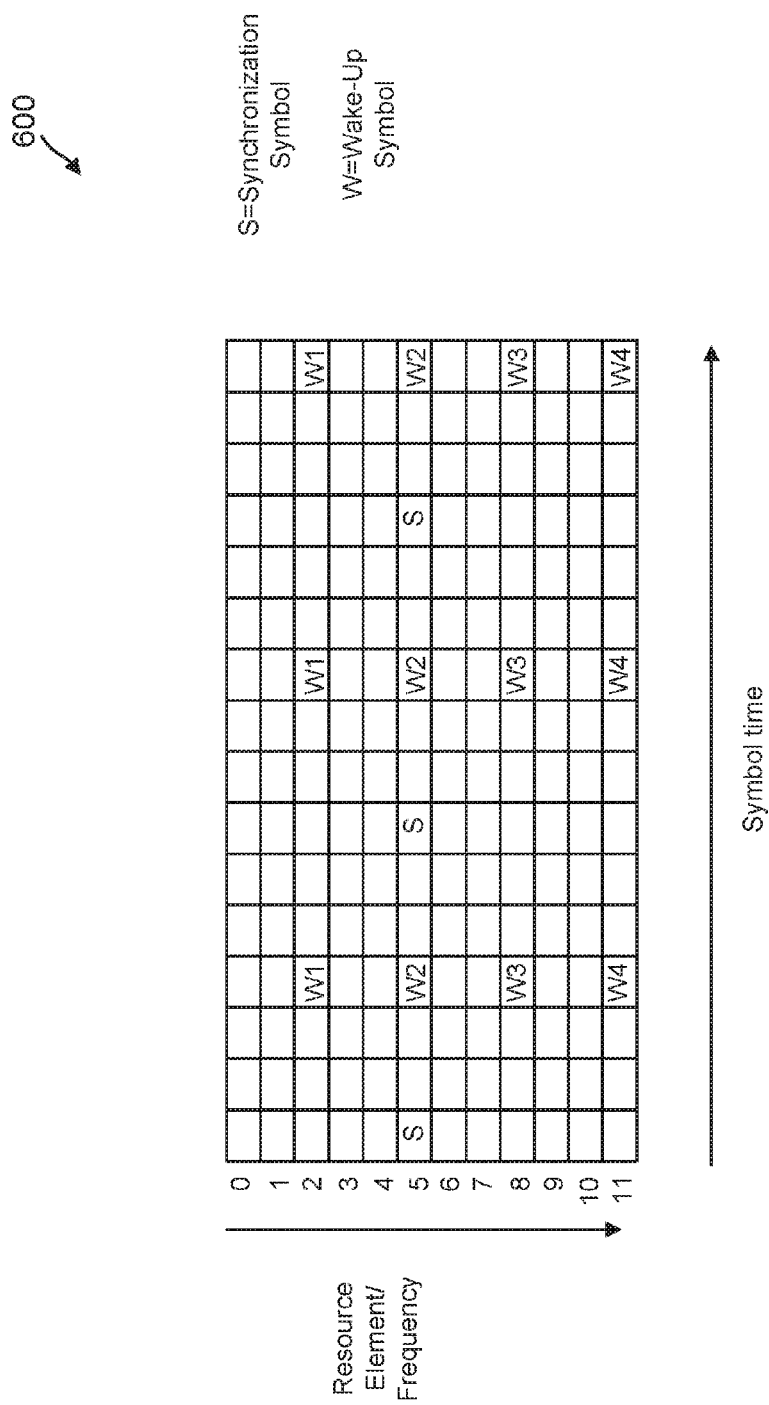
FIG. 6B illustrates an exemplary resource element allocation scheme for synchronization and wake-up signaling according to aspects of the present disclosure.

Alternatively, as illustrated in FIG. 6B, the different IOE devices 120 may be assigned different frequency subcarriers at the same time slot by the base station 110, or to a mix of frequency subcarriers and time slots. In FIG. 6B, wake-up signals W1, W2, W3, and W4 may all be transmitted during the same time slot but at different subcarriers within the range of available frequencies. Further, the wake-up signals may be transmitted at different times than the assigned times for transmission of the synchronization signals S.

As illustrated in FIG. 6B, a first IOE device 120 may wake up at the assigned time to listen for wake-up signal W1 at a $2^{nd}$ assigned subcarrier. A second IOE device 120 may wake up at the same assigned time to listen for a wake-up signal W2 at a $5^{th}$ assigned subcarrier. A third IOE device 120 may wake up at the same assigned time to listen for a wake-up signal W3 at an $8^{th}$ assigned subcarrier. A fourth IOE device 120 may wake up at the same assigned time to listen for a wake-up signal W4 at an $11^{th}$ assigned subcarrier. As will be recognized, these subcarrier spacings are exemplary only and may be greater or smaller, for example to incorporate a specified number of nulled subcarriers as described above with respect to FIGS. 5A and 5B.

As a result, according to the assignment schemes in either FIG. 6A or 6B, each IOE device 120 may wake up their low-power wake-up receiver at a different time and/or frequency resource element in order to listen for a wake-up signal W (and all wake up at the same time/frequency to listen for a synchronization signal S broadcast from base station 110). With each IOE device 120 listening at a different resource element for a wake-up signal, the signal embedding module 208 of FIG. 2 may use the same sequence of data for the wake-up signal for each IOE device 120. The signal embedding module 208 may use the same sequence of data as the synchronization signal. For example, the wake-up signal may also be a maximal length PN sequence, since this type of sequence is easy to detect with the low-power wake-up receiver at the IOE devices 120. Where each IOE device 120 has a unique time/frequency resource element combination at which to listen for the wake-up signal, the signal embedding module 208 may use the same maximal length PN sequence for the synchronization signal S and each wake-up signal W1, W2, W3, and W4 illustrated in FIGS. 6A and/or 6B.

Although described with respect to a maximal length PN sequence, which has good autocorrelation properties, it will be recognized that other PN sequences may alternatively (or additionally) be used for the synchronization and/or wake-up signals. Other PN sequences may be considered that have better cross-correlation properties, which may be useful to minimize interference from other transmitters, due to the low cross-correlation properties. Other possible PN sequence alternatives may include the Gold sequence (also called the Gold code), the Kasami sequence, and the Walsh Hadimard sequence to name just a few examples.

Returning to FIG. 2 and continuing with respect to the wake-up signals, in an alternative embodiment the signal embedding module 208 may assign multiple IOE devices 120 to wake up at the same time and frequency resource elements in order to listen for a wake-up signal with their respective low-power wake-up receivers. This is illustrated in FIG. 6C.

Figure 6C:
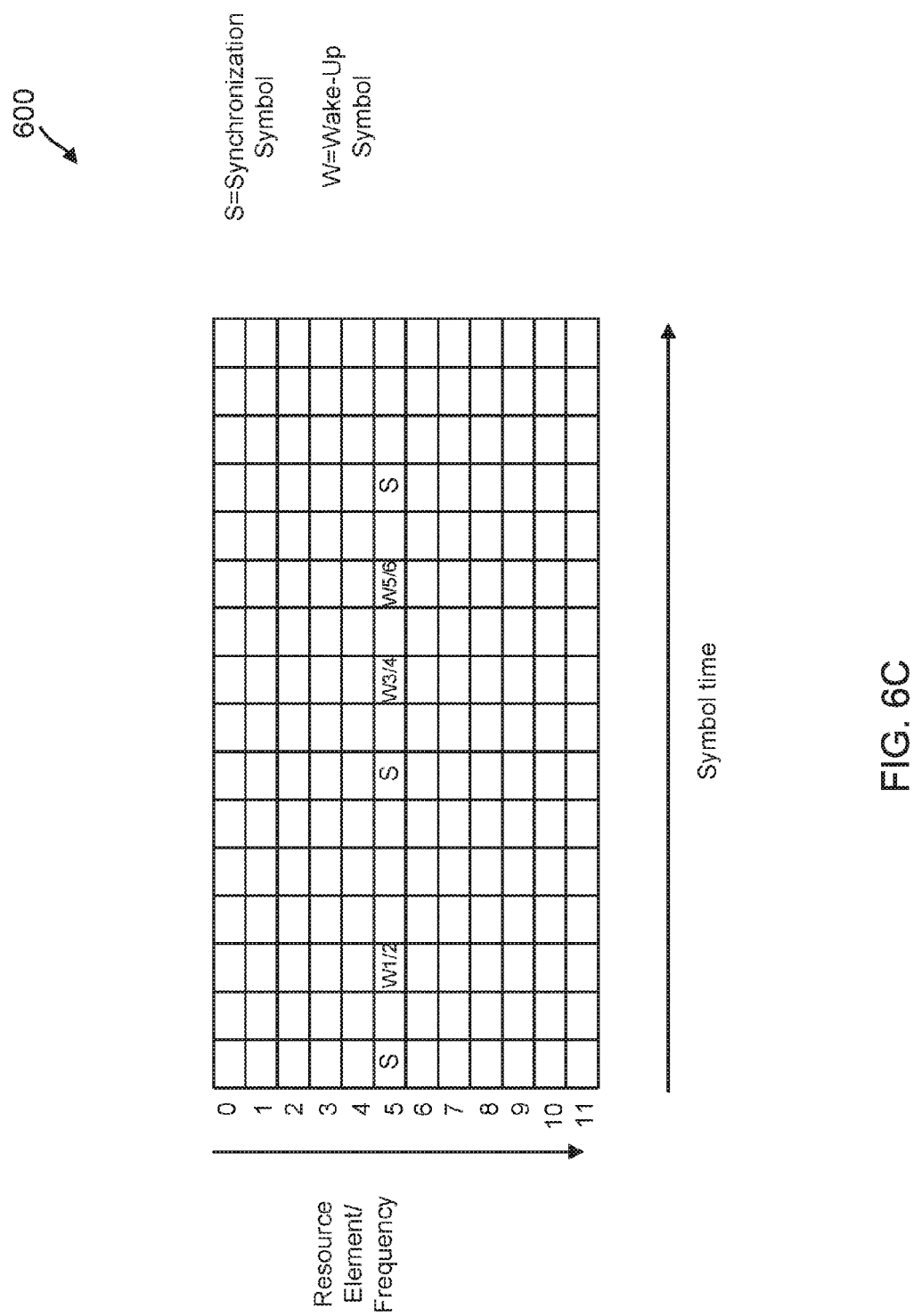
FIG. 6C illustrates an exemplary resource element allocation scheme for synchronization and wake-up signaling according to aspects of the present disclosure.

As shown in FIG. 6C, multiple IOE devices 120 may be assigned to wake up their low-power wake-up receivers at the same time and frequency resource elements to listen for a wake-up signal W1/2, W3/4, and W5/6. W1/2 indicates a wake-up signal that is intended for either a first IOE device 120 or a second IOE device 120 (both of which wake up at the assigned time/frequency), W3/4 indicates a wake-up signal intended for either a third IOE device 120 or a fourth IOE device 120, and W5/6 indicates a wake-up signal intended for either a fifth IOE device 120 or a sixth IOE device 120. Two IOE devices 120 assigned per resource element is used for simplicity of discussion only. As will be recognized, any number of IOE devices 120 may be assigned to listen at a shared time/frequency resource element. As a result of the shared assignment, multiple IOE devices 120 may wake up their low-power wake-up receiver at the same time and frequency resource element in order to listen for a wake-up signal.

In the example shown in FIG. 6C, the first IOE device 120 and the second IOE device 120 may both be assigned to the same time/frequency resource elements. As a result, a wake-up signal W1/2 transmitted will need to be configured so that the intended recipient IOE device 120 will be able to recognize the wake-up signal while the other IOE device 120 that wakes up at the same time does not recognize the wake-up signal. The signal embedding module 208 at the base station 110 may no longer use the same sequence of data for the wake-up signal for each IOE device 120 (as occurred with the embodiments of FIGS. 6A and 6B). Instead, the signal embedding module 208 may assign a different unique sequence to the first and second IOE devices 120. As a result, the signal embedding module 208 may use a different sequence for the wake-up signal W1/2 depending on which IOE device 120 is the intended recipient, while sharing the same sequence for the synchronization signals. Thus, when the wake-up signal W1/2 is intended for the first IOE device 120, the signal embedding module 208 of the base station 110 may insert a first sequence into the 01-DM waveform for modulation and transmission, and a second sequence when the wake-up signal W1/2 is intended for the second IOE device 120. The different sequences that can be transmitted for a signal wake-up signal requires higher signal-to-noise ratio (SNR) at the low-power wake-up receivers of the first and second IOE devices 120, since the IOE devices 120 distinguish between a set of PN sequences to determine if they are to wake-up their primary transceivers.

The first and second sequences may be orthogonal to each other so that they do not correlate well with each other. In an embodiment, the wake-up signal W1/2 may be composed of maximal length PN sequences as well, or also may alternatively be composed of different types of PN sequences. As with the synchronization signal S, the first and second IOE devices 120 may have received their assigned sequences at a previous time, such as during an initial attach or in a later message from the base station 110 (such as with a sleep command) The wake-up signals W3/4 and W5/6 for the third, fourth, fifth, and sixth IOE devices 120 may be configured in similar manner as described above with respect to W1/2 (namely, different sequences identify which of the specific IOE devices 120 listening at the assigned time/frequency the wake-up signal is intended for). In an embodiment, the different sequences used to distinguish between IOE devices 120 assigned to a given time/frequency may be reused for other IOE devices 120 assigned to different time/frequency resource elements. Alternatively, each IOE device 120 may be assigned a different sequence that is distinct from all other sequences used for IOE devices 120 within range of the base station 110, regardless of an assigned time/frequency.

Figure 6D:
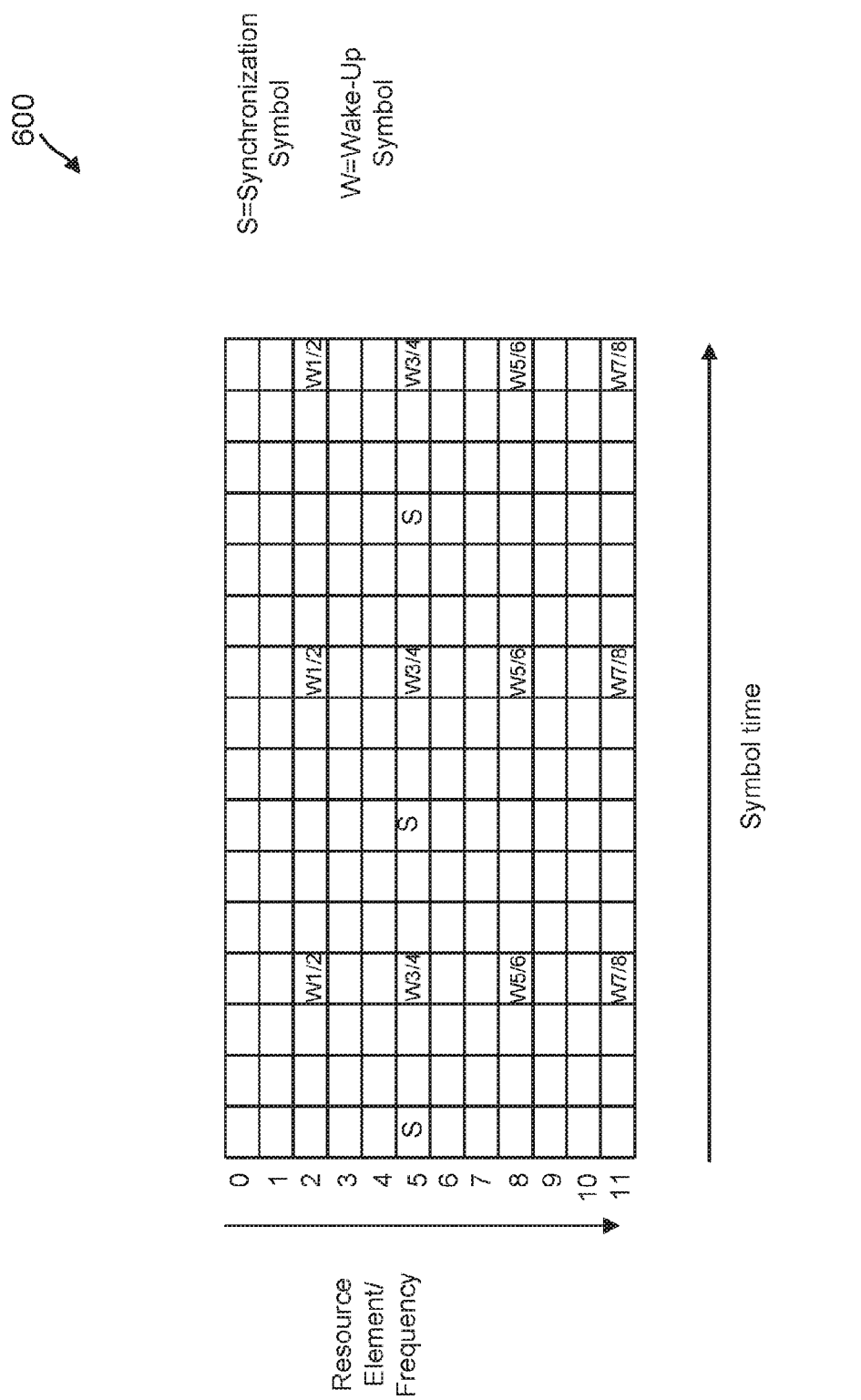
FIG. 6D illustrates an exemplary resource element allocation scheme for synchronization and wake-up signaling according to aspects of the present disclosure.

Alternatively, as illustrated in FIG. 6D, the multiple IOE devices 120 may be assigned different frequency subcarriers at the same time slot by the base station 110, or to a mix of frequency subcarriers and time slots. In FIG. 6D, wake-up signals W1/2, W3/4, W5/6, and W7/8 may all be transmitted during the same time slot but at different subcarriers within the range of available frequencies. Further, the wake-up signals may be transmitted at different times than the assigned times for transmission of the synchronization signals S. Thus, according to the embodiment of FIG. 6D, multiple frequency subcarriers may be assigned to different sets of IOE devices 120. Although illustrated with respect to two IOE devices 120 in FIGS. 6C and 6D, as will be recognized any number of IOE devices 120 may be assigned to a given time/frequency resource element.

Returning again to FIG. 2, the transceiver 210 may include a modem subsystem 212 and a radio frequency (RF) unit 214. The transceiver 210 is configured to communicate bi-directionally with other devices, such as one or more UEs 120. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The signal embedding module 208 may instruct the modem subsystem 212 of the transceiver 210 to modulate the embedded signal (synchronization or wake-up signal) with a modulation that is different than the modulation used for the data/control signaling in the rest of the OFDM downlink waveform. For example, the synchronization or wake-up signal may be modulated by elements of the modem subsystem 212 by some form of amplitude modulation, such as on-off keying (OOK), while the other data/control signaling is modulated according to QAM for example. OOK may be selected since a number of low-power wake-up receivers detect the envelope of the signal and hence can demodulate OOK. Other possible modulations that may be used for the synchronization/wake-up signals are binary phase shift keying (BPSK) and binary frequency shift keying (FSK). Binary modulation may be selected for the synchronization/wake-up signal because it is easier for the low-power wake-up receivers at the IOE devices 120 to decode the signals at low power. Where higher power (or SNR) is available, other higher-order modulation schemes may instead be used, for example amplitude shift keying (ASK) (which can be decoded with an envelope detection type wake-up receiver), or quadrature phase shift keying (QPSK) or higher order FSK at higher SNR.

The RF unit 214 may be configured to process (e.g., perform analog to digital conversion or digital to analog conversion, etc.) modulated/encoded data from the modem subsystem 212 (on outbound transmissions) or transmissions originating from another source such as a UE or IOE device 120. Although shown as integrated together in transceiver 210, the modem subsystem 212 and the RF unit 214 may be separate devices that are coupled together at the base station 110 to enable the base station 110 to communicate with other devices.

The RF unit 214 may provide the modulated and/or processed data, e.g. data packets, to the antenna 216 for transmission to one or more other devices such as UEs 120. After the transceiver 210 receives the OFDM information with the synchronization and/or wake-up signals embedded within it from the signal embedding module 208, the modem subsystem 212 may modulate and/or encode the identifying information in preparation for transmission. The RF unit 214 may receive the modulated and/or encoded data packet and process the data packet prior to passing it on to the antenna 216. This may include, for example, transmission of data messages to one or more UEs 120 including one or more IOE devices 120 according to embodiments of the present disclosure. The antenna 216 may further receive data messages transmitted from a UE and/or IOE device 120, and provide the received data messages for processing and/or demodulation at the transceiver 210.

As illustrated, antenna 216 may include multiple antennas of similar or different designs in order to sustain multiple transmission links. For example, the antenna 216, with multiple antennas, may simultaneously transmit to multiple devices, such as UE/IOE devices 120, such as employing one or more multiple-input, multiple output (MIMO) transmission schemes. As another example, the antenna 216's multiple transmit antennas could employ one or more multiple-input, single-output (MISO) transmission schemes to achieve transmit diversity or to achieve beamforming with respect to the availability of a channel estimate.

Figure 3:
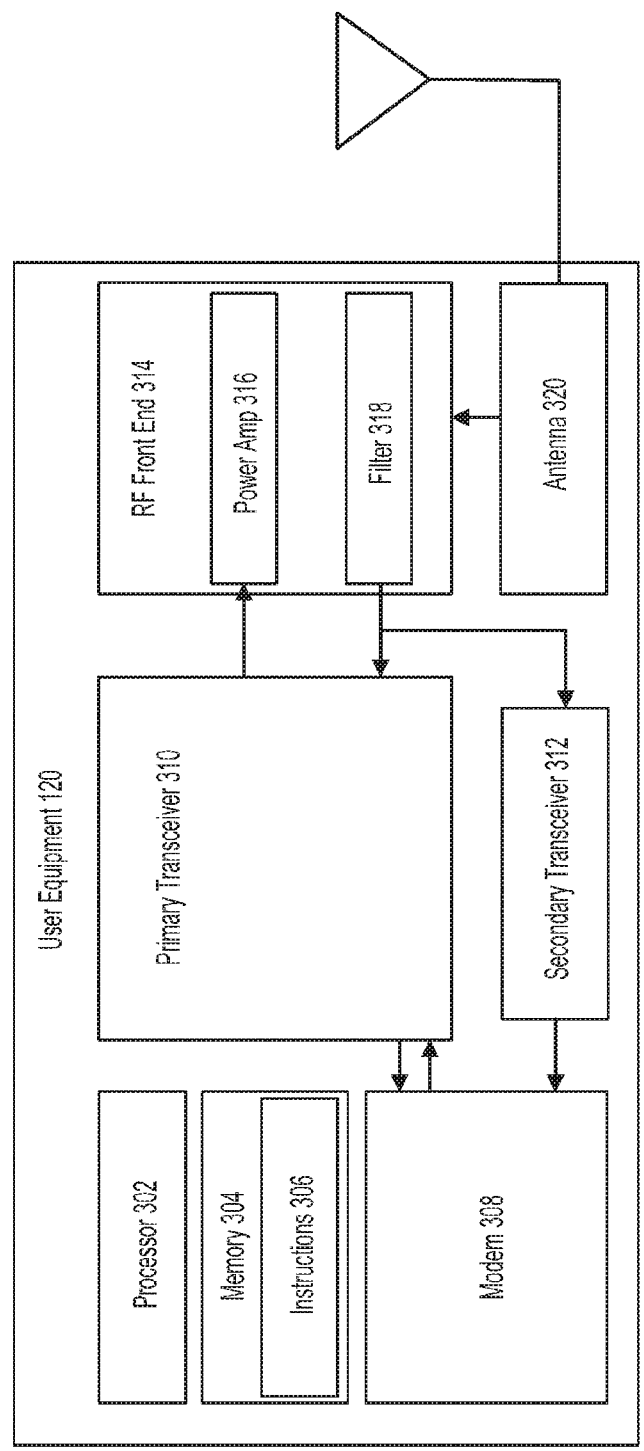
FIG. 3 is a block diagram illustrating an exemplary user equipment in accordance with various aspects of the present disclosure.

FIG. 3 is a block diagram of an exemplary UE/IOE device 120 according to embodiments of the present disclosure. For simplicity of discussion, FIG. 3 will be described with respect to an IOE device 120 as a specific example of a UE 120. The IOE device 120 may include a processor 302, a memory 304, a modem 308, a primary transceiver 310, a secondary transceiver 312, an RF front end 314, and an antenna 320 (which may be one or more multiple antennae, such as to facilitate receive/transmit diversity schemes (selection diversity, for example) to improve the robustness of communication). These elements may be in direct or indirect communication with each other, for example via one or more buses. As mentioned above with respect to FIG. 1, the IOE device 120 may communicate with a base station 110 that is within range.

The processor 302 may include a CPU, a DSP, an ASIC, a controller, a FPGA device, another hardware device, a firmware device, or any combination thereof configured to perform the operations described herein with reference to the IOE device 120 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the IOE device 120 in connection with embodiments of the present disclosure. Instructions 306 may also be referred to as code. Instructions 306 may also be referred to as code, which may be interpreted broadly to include any type of computer-readable statement(s) as discussed above with respect to FIG. 2.

The modem subsystem 308 may be configured to modulate and/or encode data according to a modulation and coding scheme (MCS), e.g., a low-density parity check (LDPC) coding scheme, a turbo coding scheme, a convolutional coding scheme, etc.

The primary transceiver 310 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as a UE or IOE device 120. For the transmitter, this may include digital to analog conversion, a local oscillator, and up conversion of baseband signals to the selected transmission frequency, to name just a few examples. For the receiver, this may include a down converter to put the received signal at baseband, a baseband filter, and an analog-to-digital converter to name a few examples.

The secondary transceiver 312 may be a low power wake-up receiver that may wake up at pre-specified times in order to listen for synchronization signals and wake-up signals. For example, the secondary transceiver 312 may be, in an embodiment, a super regenerative receiver (SRR). In some embodiments, the secondary transceiver 312 does not include transmit capabilities. In some embodiments, the secondary transceiver 312 may share at least some hardware with the primary transceiver 310. In some embodiments, the secondary transceiver 312 may refer to functionality of the primary transceiver 310 associated with demodulating the synchronization signals and wake-up signals using a low power operating mode of the primary transceiver 310. The secondary transceiver 312 may include an envelope (or energy) detector to detect the specific modulation of the synchronization/wake-up signals from the base station 110 (e.g., a binary modulation), which may be selected to be easier for the secondary transceiver 312 at the IOE device 120 to decode the signals at low power consumption. The secondary transceiver 312 may employ energy detection techniques in the time domain or the frequency domain (e.g., by use of a fast Fourier transform) in case the signal is transmitted on multiple carriers. The secondary transceiver 312 may further compare a demodulated, decoded signal (either synchronization or wake-up signals) to a previously shared and stored sequence. The previously shared and stored sequence may either be stored in a memory local to the secondary transceiver 312, or in the memory 304. For the synchronization signal, this involves comparing the received signal to the previously stored sequence to determine what local clock adjustment may be necessary to realign the clock of the IOE device 120 to the clock of the base station 110. For the wake-up signal, this involves comparing the received signal to the previously stored sequence (which may or may not be the same sequence as for the synchronization signal, as described above with respect to FIGS. 6A-6D) to determine whether the received signal is a wake-up message from the base station 110.

The RF front end 314 may include a filter 318, which may be for example a band-pass filter to filter out-of-band signals. The RF front end 314 may also include an impedance matching circuit and an amplifier 316. Although illustrated as separate, as will be recognized some aspects described above with respect to the primary transceiver 310 may be performed by the RF front end 314 (e.g., up conversion, down conversion, and mixing) and vice versa. The RF front end 314 may provide the modulated and/or processed data, e.g. data packets, to the antenna 320 for transmission to the base station 110.

The antenna 320 may include one or multiple antennas of similar or different designs in order to sustain a single or multiple transmission links, respectively. The antenna 320 of the IOE device 120 may transmit data provided from the primary transceiver 310 after modulation and coding from the modem subsystem 308 and amplification at the RF front end 314. The antenna 320 of the IOE device 120 may also receive data from multiple sources, including from a base station 110. The antenna 320 may feed the received data to the RF front end 314. Although FIG. 3 illustrates the primary and secondary transceivers 310, 312 sharing the same antenna 320, it will be recognized that the IOE device 120 may alternatively include separate antenna 320 for each transceiver type.

When data received from the antenna 320 is filtered by the filter 318, the received signal is input to the primary transceiver 310 when in regular operation. Alternatively, when the primary transceiver 310 is placed in a low-power sleep mode (e.g., a very low-power sleep mode), the received signal may be input to the secondary transceiver 312. The secondary transceiver 312 may then analyze the received information during the periods that it wakes up to either receive and process a synchronization signal or determine whether a wake-up signal has been received. If a wake-up signal has been received, the secondary transceiver 312 may wake up the primary transceiver 310 (and, in some embodiments, the rest of the components of the device 120) so that desired operations may be performed, such as receipt of data at the IOE device 120 or transmission of collected data to the base station 110.

In an exemplary embodiment, the IOE device 120 may wake up at a first, pre-specified time in order to listen for a synchronization signal. Upon receipt, the received synchronization signal may be compared to the stored (previously-shared) synchronization signal. The comparison may be to determine a correlation between the received synchronization signal and the stored synchronization signal. When correlating to the stored sequence, the correlator may obtain a strong correlation when the received synchronization signal is properly time aligned. Otherwise, when not properly time-aligned the correlator may find at what time the received signal may reach a peak compared to the stored sequence. This may allow the secondary transceiver 312 to correct a clock offset local to the IOE device 120 (which may be less accurate due to the low-power nature of the device) to be time aligned with the clock of the base station 110 (which may be more accurate).

In a further exemplary embodiment, the IOE device 120 may wake up at a second, pre-specified time in order to listen for a wake-up signal from the base station 110. As the antenna 320 picks up information from the environment, the correlator of the secondary transceiver 312 compares the information to a stored sequence. In one embodiment that corresponds to FIG. 6A or 6B, the stored sequence for the wake-up signal may be the same as the stored sequence for the synchronization signal. In another embodiment that corresponds to FIG. 6C or 6D, the stored sequence for the wake-up signal may be different from the stored sequence for the synchronization signal (as well as different than the sequences associated with other IOE devices 120 within range of the base station 110).

The secondary transceiver 312 may compare the demodulated, decoded signal received during the second, pre-specified time period to the stored sequence. A correlation value is determined as a result of the comparison, which the secondary transceiver 312 may compare to a pre-determined threshold (e.g., a correlation value with a percentage greater than 50%, such as 80% or 90% to name just a few examples). The correlation value may be related to a bit error rate of a received signal. As the bit error rate increases, the correlation value decreases; as the bit error rate decreases, the correlation value increases. Thus, when there are fewer errors between bits of a received signal and a desired sequence, the correlation value is higher than when there are more errors between bits. In an embodiment, the threshold may be with respect to a correlation value, while in another embodiment the threshold may be with respect to a bit error rate, to name just two examples.

In embodiments where the threshold value is a correlation value, if the correlation value is less than (or less than/equal to) the pre-determined threshold correlation value, then the secondary transceiver 312 may determine that a wake-up signal was not received. In the embodiments of FIGS. 6A-6B, this may mean that no wake-up signal was transmitted at all from the base station 110, while in the embodiments of FIGS. 6C-6D this may mean that either no signal was transmitted or it was intended for another IOE device 120 (and, therefore, had a sequence that substantially did not match the stored sequence at the particular IOE device 120). As a result, the secondary transceiver 312 goes back to sleep until the next pre-determined time interval.

If the correlation value is greater (or greater than/equal to) than the pre-determined threshold, then the secondary transceiver 312 may determine that the received signal was a wake-up signal that targeted the IOE device 120. As a result, the secondary transceiver 312 may send one or more signals to other components of the IOE device 120 to wake them up from deep sleep (for example, wake up the primary transceiver 310, the processor 302, and the memory 304).

In an embodiment, the pre-determined threshold may be a constant value, for example a fixed threshold correlation value. In an alternative embodiment, the pre-determined threshold may vary, for example based upon the proximity of a given IOE device 120 to the base station 110. For example, IOE devices 120 in closer proximity to the base station 110 may have a higher threshold set than IOE devices 120 that are further away. The proximity to the base station 110 may be determined based on any number of factors, including for example physical location positions (e.g., as determined by GPS values) or time of flight computations.

Figure 7:
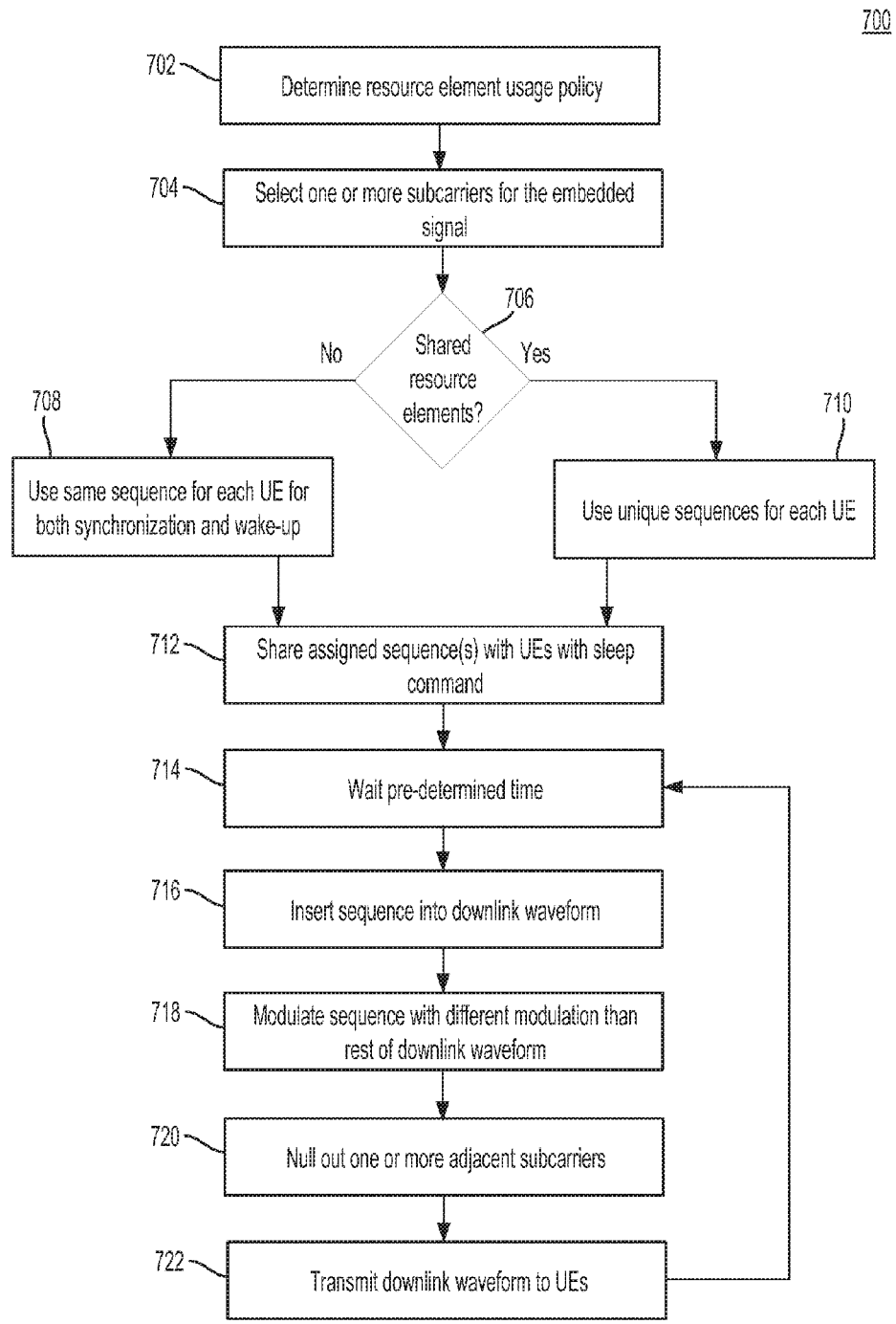
FIG. 7 is a flowchart illustrating an exemplary method for embedding signals into a downlink waveform in accordance with various aspects of the present disclosure.

Turning now to FIG. 7, a flowchart is presented that illustrates an exemplary method 700 for embedding signals in a downlink waveform in accordance with various aspects of the present disclosure. The method 700 may be implemented in a base station 110 that is in communication with one or more IOE devices 120. The method 700 will be described with respect to a specific base station 110 for simplicity of discussion, though it will be recognized that the aspects described herein may be applicable to any number of base stations 110. It is understood that additional steps can be provided before, during, and after the steps of method 700, and that some of the steps described can be replaced or eliminated for other embodiments of the method 700.

At block 702, the base station 110 determines a resource element usage policy. For example, the base station 110 may determine that all attached IOE devices 120 will use distinct resource elements. Alternatively, the base station 110 may determine that multiple IOE devices 120 will share the same time/frequency resource elements. The resource element usage policy may have been previously assigned/programmed to the base station 110 (e.g., from an external element such as another network element) or may be determined at this time.

At block 704, the base station 110 selects one or more subcarriers in which to embed the signal (either synchronization or wake-up signals according to embodiments of the present disclosure). In embodiments where the resource usage policy was previously assigned/programmed with the base station 110, the one or more subcarriers may have been previously selected/assigned as well. In that scenario, the base station 110 at block 704 retrieves the information from storage. In some embodiments, the base station 110 may dynamically determine to change the time and/or frequency resource elements in which the synchronization signal and/or wake-up signal will be embedded.

At decision block 706, the method 700 proceeds to block 708 if, according to the resource element usage policy, different attached IOE devices 120 do not share resource element(s). Since each IOE device 120 is assigned a different combination of time and frequency at which to wake up and listen to synchronization and/or wake-up signals, at block 708 the base station 110 assigns the same PN sequence to each IOE device 120 to be used for both synchronization and wake-up signals. As described above with respect to FIGS. 6A and 6B, the IOE devices 120 may be assigned to different time slots but all listen at the same subcarrier, or may be assigned to the same time slot but listen at different subcarriers, to name some examples.

Returning to decision block 706, the method 700 proceeds to block 710 if, according to the resource element usage policy, multiple attached IOE devices 120 are assigned to share resource element(s). Since multiple IOE devices 120 (e.g., two or more) may share the same time/frequency resource element combination, the base station 110 assigns different PN sequences to the IOE devices 120 sharing the resource element combination. These different PN sequences may be orthogonal to each other in order to reduce the correlation between them. As described above with respect to FIGS. 6C and 6D, multiple IOE devices 120 may share the same time slot while all IOE devices 120 share the same subcarrier across time, or multiple IOE devices 120 may share distinct subcarriers during the same time slot.

The method 700 proceeds to block 712 from either block 708 or 710. At block 712, the base station 110 shares the assigned PN sequence(s) with the attached IOE devices 120. If the method 700 proceeded from block 708, then the PN sequence shared with the attached IOE devices 120 may be the same PN sequence that is used for both synchronization signals and wake-up signals for the attached IOE devices 120. This is possible because, for the wake-up signals, each IOE device 120 wakes up at a unique time/frequency resource element combination. If the method 700 proceeds from block 710, then the base station 110 shares a plurality of different PN sequences. For example, each IOE device 120 may receive at least two distinct PN sequences: one sequence that corresponds to the sequence used for the synchronization signal and another sequence that corresponds to the sequence used for the wake-up signal for that particular IOE device 120. The sequences used for the wake-up signal for each IOE device 120 will be distinct from those used for the others.

The one or more PN sequences may be shared from the base station 110, for example, as part of a command from the base station 110 to put the IOE devices 120 into sleep mode. This command to enter sleep mode may identify the time and frequency at which each IOE device 120 should wake up the secondary transceiver to listen for a synchronization signal as well as which to wake up at to listen for a wake-up signal. The command may also specify how often the synchronization and wake-up signals repeat so that the IOE devices 120 know how often to wake up the secondary transceivers to listen for these periodic signals.

At block 714, the base station 110 waits for a pre-determined amount of time. If the next scheduled embedded signal is a synchronization signal, then the base station 110 waits the pre-determined amount of time between synchronization signals. If the next scheduled embedded signal is a wake-up signal, then the base station 110 waits the pre-determined amount of time between wake-up signals.

As will be recognized, the period of time that the base station 110 waits between embedded signals may be less than either the pre-determined time for synchronization signals or the pre-determined time for wake-up signals, as after a synchronization signal, as the base station 110 waits the pre-determined time between synchronization signals, one or more wake-up signals may be scheduled to be transmitted. Thus, at block 714 the pre-determined time the base station 110 waits may either correspond to the time between synchronization signals or the time between wake-up signals, or to the time between a synchronization signal and a wake-up signal or a wake-up signal and a synchronization signal.

At block 716, after waiting the pre-determined amount of time the base station 110 inserts a PN sequence into the downlink waveform. If the next scheduled embedded signal is a synchronization signal, then the PN sequence being inserted corresponds to the synchronization signal. If the next scheduled embedded signal is a wake-up signal (for either one distinct IOE device 120 or multiple IOE devices 120), then the PN sequence being inserted corresponds to the wake-up signal.

At block 718, the base station 110 modulates the inserted sequence of the embedded signal with a first modulation while the rest of the data/control signaling in the rest of the downlink waveform may be modulated according to a second modulation. For example, the embedded signal (either synchronization or wake-up signals) may be modulated with OOK while the rest of the waveform is an OFDM downlink waveform which may be modulated with QAM.

At block 720, the base station 110 nulls out one or more adjacent subcarriers to the selected subcarrier(s) for the embedded signal, for example as illustrated in FIG. 5A and as described above. In addition to nulling out the adjacent subcarriers, the base station 110 may further increase the power of the subcarrier used for the embedded signal while still maintaining the total transmit power of the downlink waveform, as a result of allocating the unused power of the nulled subcarriers to the embedded signal subcarrier. In addition or as an alternative to nulling out subcarriers, the base station 110 may null adjacent time slots. In an alternative embodiment, the base station 110 may skip block 720 and not null out any adjacent subcarriers or time slots.

At block 722, the base station 110 transmits the downlink waveform that includes the embedded signal to one or more UEs 120 within range, which may include one or more IOE devices.

The method 700 may then return to block 714 in order to wait until the next scheduled time to embed a synchronization signal or wake-up signal into the contemporary downlink waveform.

Figure 8:
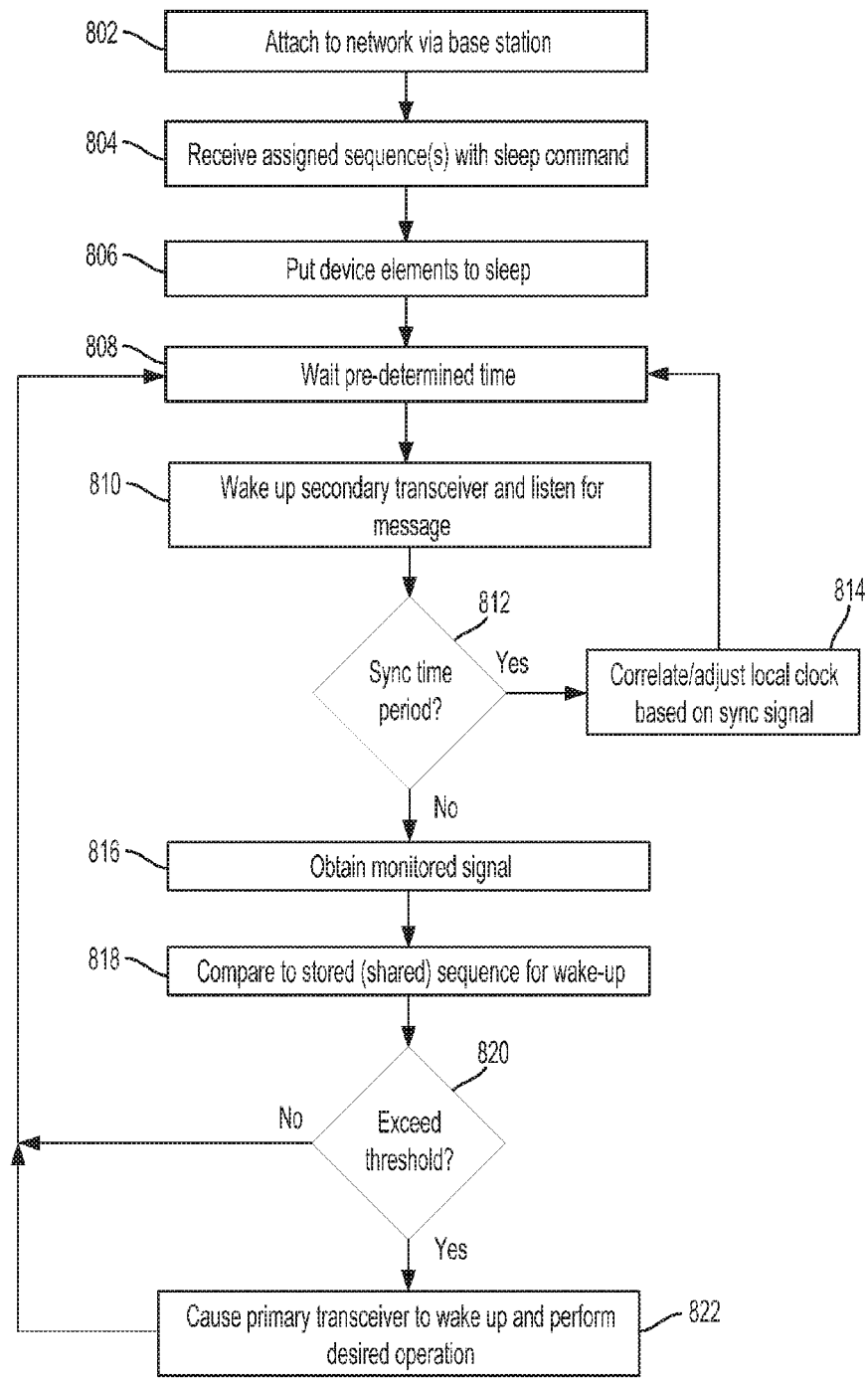
FIG. 8 is a flowchart illustrating an exemplary method for receiving embedded signals in a downlink waveform in accordance with various aspects of the present disclosure.

Turning now to FIG. 8, a flowchart is presented that illustrates an exemplary method 800 for receiving embedded signals in a downlink waveform in accordance with various aspects of the present disclosure. The method 800 may be implemented in an IOE device 120 that is in communication with a base station 110. The method 800 will be described with respect to a specific IOE device 120 for simplicity of discussion, though it will be recognized that the aspects described herein may be applicable to any number of IOE devices 120. It is understood that additional steps can be provided before, during, and after the steps of method 800, and that some of the steps described can be replaced or eliminated for other embodiments of the method 800.

At block 802, the IOE device 120 attaches to the base station 110 that is within range.

At block 804, the IOE device 120 receives one or more assigned PN sequences from the base station 110. As part of this message, the IOE device 120 may also receive the time and frequency resource elements at which the synchronization and wake-up signals may be transmitted, as well as the pre-determined amounts of time to wait to listen for a synchronization or wake-up signal. In an embodiment, the assigned PN sequences (and assigned time/frequency resource elements) may be received as part of a sleep command from the base station 110 that is intended to place the IOE device 120 into sleep mode.

At block 806, the IOE device 120 puts some or all of its constituent elements into sleep mode, e.g. a deep sleep such that just a few elements are still active, such as a clock.

At block 808, the IOE device 120 waits a pre-determined amount of time according to the times received from the base station 110 at block 804.

At block 810, the IOE device 120 wakes up its secondary transceiver, e.g. a low-power wake-up receiver, in order to listen for a message from the base station 110. This message may be a synchronization signal or a wake-up signal.

At decision block 812, if the scheduled wake-up event is for a synchronization signal broadcast, then the method 800 proceeds to block 814. At block 814, the IOE device receives the synchronization signal broadcast from the base station 110 and correlated to a local copy of the sequence previously shared with the IOE devices 120 (at block 804). When correlating the received synchronization signal to this pre-shared sequence, the IOE device 120 may see a strong correlation when the received synchronization signal is properly time aligned. This allows the low-power wake-up receiver of the IOE devices 120 to correct its clock offset to be time aligned with the clock of the base station 110. The method 800 then proceeds back to block 808 and proceeds as described.

If, at decision block 812, the scheduled wake-up event is not for a synchronization signal but rather for a wake-up signal, then the method 800 proceeds to block 816. At block 816, the IOE device 120 listens with the secondary transceiver and obtains whatever information is picked up by the antenna(s).

At block 818, the IOE device 120 compares the information obtained from the antenna to a stored sequence (the PN sequence corresponding to the wake-up sequence received at block 804). The stored sequence for the wake-up signal may be the same as the stored sequence for the synchronization signal. Alternatively, the stored sequence for the wake-up signal may be different from the stored sequence for the synchronization signal (as well as different than the sequences associated with other IOE devices 120 within range of the base station 110). As a result of the comparison, a correlation value may be determined.

At decision block 820, the IOE device 120 compares the correlation value to a pre-determined threshold (e.g., a correlation value with a percentage greater than 50%, such as 80% or 90% to name just a few examples). The IOE device 120 determines whether the determined correlation value exceeds (or, in some embodiments, is greater than or equal to) the pre-determined threshold. If the determined correlation value is not, then the method 800 returns to step 806—the secondary transceiver goes back to sleep and the IOE device 120 waits another period of time to wake up the secondary transceiver again. This corresponds to the base station 110 not having sent a wake-up signal for the IOE device 120 during that scheduled time slot.

If the IOE device 120 determines at decision block 820 that the determined correlation value exceeds the threshold, then the method 800 proceeds to block 822, where the secondary transceiver of the IOE device 120 causes the primary transceiver (and, in embodiments, of the components of the IOE device 120) to wake up to perform one or more desired operations with the base station 110 (e.g., either receiving data or transmitting requested data to the base station 110).

In embodiments where the threshold value is a correlation value, if the correlation value is less than (or less than/equal to) the pre-determined threshold correlation value, then the secondary transceiver 312 may determine that a wake-up signal was not received. In the embodiments of FIGS. 6A-6B, this may mean that no wake-up signal was transmitted at all from the base station 110, while in the embodiments of FIGS. 6C-6D this may mean that either no signal was transmitted or it was intended for another IOE device 120 (and, therefore, had a sequence that substantially did not match the stored sequence at the particular IOE device 120). As a result, the secondary transceiver 312 goes back to sleep until the next pre-determined time interval.

The method 800 may then return to block 808 in order to wait until the next scheduled time to wake up the secondary transceiver to listen for either a synchronization signal or wake-up signal from the base station 110.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a computer-readable medium having program code recorded thereon, the program code comprising: code for causing a first communications device to identify at least one subcarrier within an orthogonal frequency division multiplexing (OFDM) downlink signal for use in communicating with a wake-up receiver of a second communications device while a primary receiver of the second communications device is in deep sleep. The program code further comprises code for causing the first communications device to insert an embedded signal into the identified at least one subcarrier at one or more pre-specified times for transmission to the wake-up receiver of the second communications device. The program code further comprises code for causing the first communications device to transmit the embedded signal to the wake-up receiver of the second communications device with a first modulation using the identified at least one subcarrier, the first modulation being different from a second modulation used in transmitting data with one or more remaining subcarriers in the OFDM downlink signal.

The program code further includes code for causing the first communications device to modulate one or more adjacent subcarriers to the identified one or more subcarriers with zero amplitude. The program code further includes code for causing the first communications device to boost a power of the embedded signal a fixed amount that is less than or equal to an amount of power freed up from the one or more adjacent subcarriers modulated with zero amplitude. The program code further includes wherein the embedded signal comprises a synchronization signal assigned to a first time from among the one or more pre-specified times, the synchronization signal including data to enable the second communications device to synchronize a clock local to the second communications device to a clock local to the first communications device. The program code further includes wherein the embedded signal comprises a wake-up signal assigned to a second time from among the one or more pre-specified times, the first and second times being different from each other, the wake-up signal indicating to the second communications device to wake up the primary receiver for a pre-determined operation. The program code further includes wherein the first communications device communicates with a plurality of second communications devices, each second communications device comprising a wake-up receiver. The program code further includes code for causing the first communications device to broadcast the synchronization signal to the plurality of second communications devices in the first time, the synchronization signal comprising a first pseudo-random noise sequence. The program code further includes wherein the second time comprises a plurality of times, each different from the first time and from each other. The program code further includes code for causing the first communications device to assign, to each second communications device, a different time from among the plurality of different times at which each second communications device is to wake up its wake-up receiver to listen for the wake-up signal, wherein the wake-up signal comprises the first pseudo-random noise sequence. The program code further includes wherein the at least one subcarrier comprises a plurality of subcarriers. The program code further includes code for causing the first communications device to assign, to a first device from among the plurality of second communications devices, a first subcarrier that is used to transmit the wake-up signal to the first device during the second time. The program code further includes code for causing the first communications device to assign, to a second device from among the plurality of second communications devices, a second subcarrier that is used to transmit the wake-up signal to the second device during the second time, the first and second subcarriers being different from each other in frequency, wherein the wake-up signal transmitted on the first and second subcarriers each comprises the first pseudo-random noise sequence. The program code further includes wherein the second time comprises a plurality of times, each different from the first time and from each other. The program code further includes code for causing the first communications device to assign a first group of communications devices from among the plurality of second communications devices to a first different time from among the plurality of different times and a second group of communications devices from among the plurality of second communications devices to a second different time from among the plurality of different times. The program code further includes wherein the first group of communications devices is to wake up their wake-up receivers to listen for the wake-up signal during the first different time and the second group of communications devices is to wake up their wake-up receivers to listen for the wake-up signal during the second different time. The program code further includes wherein the wake-up signal for the first group of communications devices comprises a second pseudo-random noise sequence and the wake-up signal for the second group of communications devices comprises a third pseudo-random noise sequence. The program code further includes code for causing the first communications device to share the first pseudo-random noise sequence to the plurality of second communications devices prior to transmission of the embedded signal. The program code further includes wherein the first modulation comprises on-off keying, the first communications device comprises a base station, and the second communications device comprises an internet of everything (IOE) device. The program code further includes code for causing the first communications device to assign a periodicity to the embedded signal to achieve a pre-determined amount of desired latency for waking up the primary receiver of the second communications device from the deep sleep.

Embodiments of the present disclosure further include a computer-readable medium having program code recorded thereon, the program code comprising code for causing a first communications device to wake up a wake-up receiver of the first communications device, while a primary receiver of the first communications device is in deep sleep, at a pre-determined time to listen for an embedded signal within at least one selected subcarrier in an orthogonal frequency multiplexing (OFDM) downlink signal from a second communications device. The program code further includes code for causing the first communications device to detect a signal at the at least one selected subcarrier during the pre-determined time. The program code further includes code for causing the first communications device to determine whether the detected signal is the embedded signal having a first modulation from the second communications device and intended for the first communications device, the first modulation being different from a second modulation used in transmitting data with one or more remaining subcarriers in the OFDM downlink signal.

The program code further includes code for causing the first communications device to wake up the primary receiver in response to determining that the detected signal is the embedded signal intended for the first communications device. The program code further includes wherein the pre-determined time comprises a plurality of specified times. The program code further includes wherein the embedded signal comprises a synchronization signal that is assigned to a first time from among the plurality of specified times, the synchronization signal comprising a first pseudo-random noise sequence previously shared with the first communications device. The program code further includes wherein the embedded signal comprises a wake-up signal assigned to a second time from among the plurality of specified times, the first and second times being different from each other, the wake-up signal indicating to the first communications device to wake up the primary receiver for a pre-determined operation. The program code further includes wherein the detected signal is received during the first time. The program code further includes code for causing the first communications device to determine a correlation of the detected signal to the first pseudo-random noise sequence of the synchronization signal. The program code further includes code for causing the first communications device to correct a clock offset of a clock local to the first communications device to be time aligned with a clock local to the second communications device based on a resulting magnitude of the correlation. The program code further includes wherein the detected signal is received during the second time, the wake-up signal comprises the first pseudo-random noise sequence, and the second time is uniquely assigned to the first communications device. The program code further includes code for causing the first communications device to determine a correlation of the detected signal to the first pseudo-random noise sequence of the wake-up signal. The program code further includes code for causing the first communications device to compare the correlation to a pre-determined threshold level. The program code further includes code for causing the first communications device to determine that the detected signal is the wake-up signal if the correlation exceeds the pre-determined threshold level and, in response, to wake up the primary receiver. The program code further includes wherein the detected signal is received during the second time, the wake-up signal comprises a second pseudo-random noise sequence, and the second time is assigned to more than one communications device including the first communications device. The program code further includes code for causing the first communications device to determine a correlation of the detected signal to the second pseudo-random noise sequence of the wake-up signal. The program code further includes code for causing the first communications device to compare the correlation to a pre-determined threshold level. The program code further includes code for causing the first communications device to determine that the detected signal is the wake-up signal if the correlation exceeds the pre-determined threshold level and, in response, to wake up the primary receiver. The program code further includes code for causing the first communications device to determine that the detected signal is directed toward another communications device sharing the second time if the correlation falls below the pre-determined threshold. The program code further includes wherein the detected signal is received during the second time that is shared between a plurality of communications devices including the first communications device, the wake-up signal comprises the first pseudo-random noise sequence, and the at least one selected subcarrier is uniquely assigned to the first communications device. The program code further includes code for causing the first communications device to determine a correlation of the detected signal to the first pseudo-random noise sequence of the wake-up signal. The program code further includes code for causing the first communications device to compare the correlation to a pre-determined threshold level. The program code further includes code for causing the first communications device to determine that the detected signal is the wake-up signal if the correlation exceeds the pre-determined threshold level and, in response, to wake up the primary receiver. The program code further includes wherein the first modulation comprises on-off keying, the first communications device comprises an internet of everything (IOE) device, and the second communications device comprises a base station. The program code further includes code for causing the first communications device to wake up the wake-up receiver according to a pre-assigned periodicity to achieve a pre-determined amount of desired latency for waking up the primary receiver of the first communications device from the deep sleep.

Embodiments of the present disclosure further include a wireless communications device comprising means for identifying at least one subcarrier within an orthogonal frequency division multiplexing (OFDM) downlink signal for use in communicating with a wake-up receiver of a second wireless communications device while a primary receiver of the second wireless communications device is in deep sleep. The wireless communications device further includes means for inserting an embedded signal into the identified at least one subcarrier at one or more pre-specified times for transmission to the wake-up receiver of the second wireless communications device. The wireless communications device further includes means for transmitting the embedded signal to the wake-up receiver of the second wireless communications device with a first modulation using the identified at least one subcarrier, the first modulation being different from a second modulation used in transmitting data with one or more remaining subcarriers in the OFDM downlink signal.

The wireless communications device further includes means for modulating one or more adjacent subcarriers to the identified one or more subcarriers with zero amplitude. The wireless communications device further includes means for boosting a power of the embedded signal a fixed amount that is less than or equal to an amount of power freed up from the one or more adjacent subcarriers modulated with zero amplitude. The wireless communications device further includes wherein the embedded signal comprises a synchronization signal assigned to a first time from among the one or more pre-specified times, the synchronization signal including data to enable the second wireless communications device to synchronize a clock local to the second wireless communications device to a clock local to the wireless communications device. The wireless communications device further includes the embedded signal comprises a wake-up signal assigned to a second time from among the one or more pre-specified times, the first and second times being different from each other, the wake-up signal indicating to the second wireless communications device to wake up the primary receiver for a pre-determined operation. The wireless communications device further includes wherein the wireless communications device communicates with a plurality of second wireless communications devices, each second wireless communications device comprising a wake-up receiver. The wireless communications device further includes means for broadcasting the synchronization signal to the plurality of second wireless communications devices in the first time, the synchronization signal comprising a first pseudo-random noise sequence. The wireless communications device further includes wherein the second time comprises a plurality of times, each different from the first time and from each other. The wireless communications device further includes means for assigning, to each second wireless communications device, a different time from among the plurality of different times at which each second wireless communications device is to wake up its wake-up receiver to listen for the wake-up signal, wherein the wake-up signal comprises the first pseudo-random noise sequence. The wireless communications device further includes wherein the at least one subcarrier comprises a plurality of subcarriers. The wireless communications device further includes means for assigning, to a first device from among the plurality of second wireless communications devices, a first subcarrier that is used to transmit the wake-up signal to the first device during the second time. The wireless communications device further includes means for assigning, to a second device from among the plurality of second wireless communications devices, a second subcarrier that is used to transmit the wake-up signal to the second device during the second time, the first and second subcarriers being different from each other in frequency, wherein the wake-up signal transmitted on the first and second subcarriers each comprises the first pseudo-random noise sequence. The wireless communications device further includes wherein the second time comprises a plurality of times, each different from the first time and from each other. The wireless communications device further includes means for assigning a first group of communications devices from among the plurality of second wireless communications devices to a first different time from among the plurality of different times and a second group of communications devices from among the plurality of second wireless communications devices to a second different time from among the plurality of different times. The wireless communications device further includes wherein the first group of communications devices is to wake up their wake-up receivers to listen for the wake-up signal during the first different time and the second group of communications devices is to wake up their wake-up receivers to listen for the wake-up signal during the second different time. The wireless communications device further includes wherein the wake-up signal for the first group of communications devices comprises a second pseudo-random noise sequence and the wake-up signal for the second group of communications devices comprises a third pseudo-random noise sequence. The wireless communications device further includes means for sharing the first pseudo-random noise sequence to the plurality of second wireless communications devices prior to transmission of the embedded signal. The wireless communications device further includes wherein the first modulation comprises on-off keying, the wireless communications device comprises a base station, and the second wireless communications device comprises an internet of everything (IOE) device. The wireless communications device further includes means for assigning a periodicity to the embedded signal to achieve a pre-determined amount of desired latency for waking up the primary receiver of the second wireless communications device from the deep sleep.

Embodiments of the present disclosure further include a wireless communications device comprising means for waking up a wake-up receiver of the wireless communications device, while a primary receiver of the wireless communications device is in deep sleep, at a pre-determined time to listen for an embedded signal within at least one selected subcarrier in an orthogonal frequency multiplexing (OFDM) downlink signal from a second wireless communications device. The wireless communications device further includes means for detecting a signal at the wake-up receiver at the at least one selected subcarrier during the pre-determined time. The wireless communications device further includes means for determining whether the detected signal is the embedded signal having a first modulation from the second wireless communications device and intended for the wireless communications device, the first modulation being different from a second modulation used in transmitting data with one or more remaining subcarriers in the OFDM downlink signal.

The wireless communications device further includes means for waking up the primary receiver in response to determining that the detected signal is the embedded signal intended for the wireless communications device. The wireless communications device further includes wherein the pre-determined time comprises a plurality of specified times. The wireless communications device further includes wherein the embedded signal comprises a synchronization signal that is assigned to a first time from among the plurality of specified times, the synchronization signal comprising a first pseudo-random noise sequence previously shared with the wireless communications device. The wireless communications device further includes wherein the embedded signal comprises a wake-up signal assigned to a second time from among the plurality of specified times, the first and second times being different from each other, the wake-up signal indicating to the wireless communications device to wake up the primary receiver for a pre-determined operation. The wireless communications device further includes wherein the detected signal is received during the first time. The wireless communications device further includes means for determining a correlation of the detected signal to the first pseudo-random noise sequence of the synchronization signal. The wireless communications device further includes means for correcting a clock offset of a clock local to the wireless communications device to be time aligned with a clock local to the second wireless communications device based on a resulting magnitude of the correlation. The wireless communications device further includes wherein the detected signal is received during the second time, the wake-up signal comprises the first pseudo-random noise sequence, and the second time is uniquely assigned to the wireless communications device. The wireless communications device further includes means for determining a correlation of the detected signal to the first pseudo-random noise sequence of the wake-up signal. The wireless communications device further includes means for comparing the correlation to a pre-determined threshold level. The wireless communications device further includes means for determining that the detected signal is the wake-up signal if the correlation exceeds the pre-determined threshold level and, in response, for waking up the primary receiver. The wireless communications device further includes wherein the detected signal is received during the second time, the wake-up signal comprises a second pseudo-random noise sequence, and the second time is assigned to more than one wireless communications device including the wireless communications device. The wireless communications device further includes means for determining a correlation of the detected signal to the second pseudo-random noise sequence of the wake-up signal. The wireless communications device further includes means for comparing the correlation to a pre-determined threshold level. The wireless communications device further includes means for determining that the detected signal is the wake-up signal if the correlation exceeds the pre-determined threshold level and, in response, for waking up the primary receiver. The wireless communications device further includes means for determining that the detected signal is directed toward another wireless communications device sharing the second time if the correlation falls below the pre-determined threshold. The wireless communications device further includes wherein the detected signal is received during the second time that is shared between a plurality of wireless communications devices including the wireless communications device, the wake-up signal comprises the first pseudo-random noise sequence, and the at least one selected subcarrier is uniquely assigned to the wireless communications device. The wireless communications device further includes means for determining a correlation of the detected signal to the first pseudo-random noise sequence of the wake-up signal. The wireless communications device further includes means for comparing the correlation to a pre-determined threshold level. The wireless communications device further includes means for determining that the detected signal is the wake-up signal if the correlation exceeds the pre-determined threshold level and, in response, for waking up the primary receiver. The wireless communications device further includes wherein the first modulation comprises on-off keying, the wireless communications device comprises an internet of everything (IOE) device, and the second wireless communications device comprises a base station. The wireless communications device further includes means for waking up the wake-up receiver according to a pre-assigned periodicity to achieve a pre-determined amount of desired latency for waking up the primary receiver of the first communications device from the deep sleep.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, comprising:
   identifying, by a first communications device, at least one subcarrier within an orthogonal frequency division multiplexing (OFDM) downlink signal for use in communicating with a wake-up receiver of a second communications device with a primary receiver of the second communications device in deep sleep;
   inserting, by the first communications device, an embedded signal into the identified at least one subcarrier at one or more pre-specified times for transmission to the wake-up receiver of the second communications device; and
   transmitting, from the first communications device, the embedded signal for reception at the wake-up receiver of the second communications device with a first modulation using the identified at least one subcarrier, the first modulation being different from a second modulation used in transmitting data with one or more remaining subcarriers in the OFDM downlink signal.

2. The method of claim 1, further comprising:
   modulating one or more adjacent subcarriers to the identified one or more subcarriers with zero amplitude; and
   boosting a power of the embedded signal an amount based on an amount of power freed up from the one or more adjacent subcarriers modulated with zero amplitude.

3. The method of claim 1, wherein:
   the embedded signal comprises a synchronization signal assigned to a first time from among the one or more pre-specified times, the synchronization signal including data to enable the second communications device to synchronize a clock local to the second communications device to a clock local to the first communications device, and
   the embedded signal comprises a wake-up signal assigned to a second time from among the one or more pre-specified times, the first and second times being different from each other, the wake-up signal indicating to the second communications device to wake up the primary receiver for a pre-determined operation.

4. The method of claim 3, wherein the first communications device communicates with a plurality of second communications devices, each second communications device comprising a wake-up receiver, the method further comprising:
   broadcasting the synchronization signal to the plurality of second communications devices in the first time, the synchronization signal comprising a first pseudo-random noise sequence.

5. The method of claim 4, wherein the second time comprises a plurality of times, each different from the first time and from each other, the method further comprising:
   assigning, to each second communications device, a different time from among the plurality of different times at which each second communications device is to wake up its wake-up receiver to listen for the wake-up signal, wherein the wake-up signal comprises the first pseudo-random noise sequence.

6. The method of claim 4, wherein the at least one subcarrier comprises a plurality of subcarriers, the method further comprising:
assigning, to a first device from among the plurality of second communications devices, a first subcarrier that is used to transmit the wake-up signal to the first device during the second time; and
assigning, to a second device from among the plurality of second communications devices, a second subcarrier that is used to transmit the wake-up signal to the second device during the second time, the first and second subcarriers being different from each other in frequency,
wherein the wake-up signal transmitted on the first and second subcarriers each comprises the first pseudo-random noise sequence.

7. The method of claim 4, wherein the second time comprises a plurality of times, each different from the first time and from each other, the method further comprising:
assigning a first group of communications devices from among the plurality of second communications devices to a first different time from among the plurality of different times and a second group of communications devices from among the plurality of second communications devices to a second different time from among the plurality of different times,
wherein the first group of communications devices is to wake up their wake-up receivers to listen for the wake-up signal during the first different time and the second group of communications devices is to wake up their wake-up receivers to listen for the wake-up signal during the second different time, and
wherein the wake-up signal for the first group of communications devices comprises a second pseudo-random noise sequence and the wake-up signal for the second group of communications devices comprises a third pseudo-random noise sequence.

8. The method of claim 1, wherein:
the first modulation comprises on-off keying;
the first communications device comprises a base station; and
the second communications device comprises an internet of everything (IOE) device.

9. A method for wireless communication, comprising:
waking up a wake-up receiver of a first communications device, while a primary receiver of the first communications device is in deep sleep, at a pre-determined time to listen for an embedded signal within at least one selected subcarrier in an orthogonal frequency multiplexing (OFDM) downlink signal from a second communications device;
detecting a signal at the wake-up receiver at the at least one selected subcarrier during the pre-determined time; and
determining whether the detected signal is the embedded signal having a first modulation from the second communications device and intended for the first communications device, the first modulation being different from a second modulation used in transmitting data with one or more remaining subcarriers in the OFDM downlink signal.

10. The method of claim 9, further comprising:
waking up the primary receiver in response to determining that the detected signal is the embedded signal intended for the first communications device, wherein:
the first modulation comprises on-off keying;
the first communications device comprises an internet of everything (IOE) device; and
the second communications device comprises a base station.

11. The method of claim 9, wherein:
the pre-determined time comprises a plurality of specified times,
the embedded signal comprises a synchronization signal that is assigned to a first time from among the plurality of specified times, the synchronization signal comprising a first pseudo-random noise sequence previously shared with the first communications device, and
the embedded signal comprises a wake-up signal assigned to a second time from among the plurality of specified times, the first and second times being different from each other, the wake-up signal indicating to the first communications device to wake up the primary receiver for a pre-determined operation.

12. The method of claim 11, wherein the detected signal is received during the first time, the method further comprising:
determining, by the first communications device, a correlation of the detected signal to the first pseudo-random noise sequence of the synchronization signal; and
correcting, by the first communications device, a clock offset of a clock local to the first communications device to be time aligned with a clock local to the second communications device based on a resulting magnitude of the correlation.

13. The method of claim 11, wherein the detected signal is received during the second time, the wake-up signal comprises the first pseudo-random noise sequence, and the second time is uniquely assigned to the first communications device, the method further comprising:
determining, by the first communications device, a correlation of the detected signal to the first pseudo-random noise sequence of the wake-up signal; and
comparing the correlation to a pre-determined threshold level, wherein the first communications device determines that the detected signal is the wake-up signal if the correlation exceeds the pre-determined threshold level and, in response, wakes up the primary receiver.

14. The method of claim 11, wherein the detected signal is received during the second time, the wake-up signal comprises a second pseudo-random noise sequence, and the second time is assigned to more than one communications device including the first communications device, the method further comprising:
determining, by the first communications device, a correlation of the detected signal to the second pseudo-random noise sequence of the wake-up signal; and
comparing the correlation to a pre-determined threshold level, wherein the first communications device determines that the detected signal is the wake-up signal if the correlation exceeds the pre-determined threshold level and, in response, wakes up the primary receiver and that the detected signal is directed toward another communications device sharing the second time if the correlation falls below the pre-determined threshold.

15. The method of claim 11, wherein the detected signal is received during the second time that is shared between a plurality of communications devices including the first communications device, the wake-up signal comprises the first pseudo-random noise sequence, and the at least one selected subcarrier is uniquely assigned to the first communications device, the method further comprising:
- determining, by the first communications device, a correlation of the detected signal to the first pseudo-random noise sequence of the wake-up signal; and
- comparing the correlation to a pre-determined threshold level, wherein the first communications device determines that the detected signal is the wake-up signal if the correlation exceeds the pre-determined threshold level and, in response, wakes up the primary receiver.

16. A wireless communications device, comprising:
a processor configured to:
- identify at least one subcarrier within an orthogonal frequency division multiplexing (OFDM) downlink signal for use in communicating with a wake-up receiver of a second wireless communications device with a primary receiver of the second wireless communications device in deep sleep; and
- insert an embedded signal into the identified at least one subcarrier at one or more pre-specified times for transmission; and a transceiver configured to transmit the embedded signal for reception at the wake-up receiver of the second wireless communications device with a first modulation using the identified at least one subcarrier, the first modulation being different from a second modulation used in transmitting data with one or more remaining subcarriers in the OFDM downlink signal.

17. The wireless communications device of claim 16, wherein the transceiver is further configured to:
- modulate one or more adjacent subcarriers to the identified one or more subcarriers with zero amplitude; and
- boost a power of the embedded signal an amount based on an amount of power freed up from the one or more adjacent subcarriers modulated with zero amplitude.

18. The wireless communications device of claim 16, wherein:
- the embedded signal comprises a synchronization signal assigned to a first time from among the one or more pre-specified times, the synchronization signal including data to enable the second wireless communications device to synchronize a clock local to the second wireless communications device to a clock local to the wireless communications device, and
- the embedded signal comprises a wake-up signal assigned to a second time from among the one or more pre-specified times, the first and second times being different from each other, the wake-up signal indicating to the second wireless communications device to wake up the primary receiver for a pre-determined operation.

19. The wireless communications device of claim 18, wherein:
- the wireless communications device communicates with a plurality of second wireless communications devices, each second wireless communications device comprising a wake-up receiver, and
- the transceiver is further configured to broadcast the synchronization signal to the plurality of second wireless communications devices in the first time, the synchronization signal comprising a first pseudo-random noise sequence.

20. The wireless communications device of claim 19, wherein:
- the second time comprises a plurality of times, each different from the first time and from each other,
- the processor is further configured to assign, to each second wireless communications device, a different time from among the plurality of different times at which each second wireless communications device is to wake up its wake-up receiver to listen for the wake-up signal, and
- the wake-up signal comprises the first pseudo-random noise sequence.

21. The wireless communications device of claim 19, wherein the at least one subcarrier comprises a plurality of subcarriers, the processor being further configured to:
- assign, to a first device from among the plurality of second wireless communications devices, a first subcarrier that is used to transmit the wake-up signal to the first device during the second time; and
- assign, to a second device from among the plurality of second wireless communications devices, a second subcarrier that is used to transmit the wake-up signal to the second device during the second time, the first and second subcarriers being different from each other in frequency and the wake-up signal being transmitted on the first and second subcarriers each comprising the first pseudo-random noise sequence.

22. The wireless communications device of claim 19, wherein the second time comprises a plurality of times, each different from the first time and from each other, the processor being further configured to:
- assign a first group of wireless communications devices from among the plurality of second wireless communications devices to a first different time from among the plurality of different times and a second group of wireless communications devices from among the plurality of second wireless communications devices to a second different time from among the plurality of different times,
- wherein the first group of wireless communications devices is to wake up their wake-up receivers to listen for the wake-up signal during the first different time and the second group of wireless communications devices is to wake up their wake-up receivers to listen for the wake-up signal during the second different time, and
- wherein the wake-up signal for the first group of wireless communications devices comprises a second pseudo-random noise sequence and the wake-up signal for the second group of wireless communications devices comprises a third pseudo-random noise sequence.

23. The wireless communications device of claim 16, wherein:
- the first modulation comprises on-off keying;
- the wireless communications device comprises a base station; and
- the second wireless communications device comprises an internet of everything (IOE) device.

24. A wireless communications device, comprising:
a primary receiver configured to enter deep sleep; and
a wake-up receiver configured to:
- wake up, while the primary receiver is in deep sleep, at a pre-determined time to listen for an embedded signal intended for the wireless communications device within at least one selected subcarrier in an orthogonal frequency multiplexing (OFDM) downlink signal from a second wireless communications device;
- detect a signal at the at least one selected subcarrier during the pre-determined time; and
- determine whether the detected signal is the embedded signal having a first modulation from the second wireless communications device, the first modulation being different from a second modulation used in transmitting data with one or more remaining subcarriers in the OFDM downlink signal.

25. The wireless communications device of claim 24, wherein the wake-up receiver is further configured to:
wake up the primary receiver in response to determining that the detected signal is the embedded signal intended for the wireless communications device, wherein:
the first modulation comprises on-off keying;
the wireless communications device comprises an internet of everything (IOE) device; and
the second wireless communications device comprises a base station.

26. The wireless communications device of claim 24, wherein:
the pre-determined time comprises a plurality of specified times,
the embedded signal comprises a synchronization signal that is assigned to a first time from among the plurality of specified times, the synchronization signal comprising a first pseudo-random noise sequence previously shared with the wireless communications device, and
the embedded signal comprises a wake-up signal assigned to a second time from among the plurality of specified times, the first and second times being different from each other, the wake-up signal indicating to the wireless communications device to wake up the primary receiver for a pre-determined operation.

27. The wireless communications device of claim 26, wherein the detected signal is received during the first time, the wake-up receiver being further configured to:
determine a correlation of the detected signal to the first pseudo-random noise sequence of the synchronization signal; and
correct a clock offset of a clock local to the wireless communications device to be time aligned with a clock local to the second wireless communications device based on a resulting magnitude of the correlation.

28. The wireless communications device of claim 26, wherein the detected signal is received during the second time, the wake-up signal comprises the first pseudo-random noise sequence, and the second time is uniquely assigned to the wireless communications device, the wake-up receiver being further configured to:
determine a correlation of the detected signal to the first pseudo-random noise sequence of the wake-up signal;
compare the correlation to a pre-determined threshold level; and
determine that the detected signal is the wake-up signal if the correlation exceeds the pre-determined threshold level and, in response, wake up the primary receiver.

29. The wireless communications device of claim 26, wherein the detected signal is received during the second time, the wake-up signal comprises a second pseudo-random noise sequence, and the second time is assigned to more than one communications device including the wireless communications device, the wake-up receiver being further configured to:
determine a correlation of the detected signal to the second pseudo-random noise sequence of the wake-up signal;
compare the correlation to a pre-determined threshold level;
determine that the detected signal is the wake-up signal if the correlation exceeds the pre-determined threshold level and, in response, wake up the primary receiver; and
determine that the detected signal is directed toward another communications device sharing the second time if the correlation falls below the pre-determined threshold.

30. The wireless communications device of claim 26, wherein the detected signal is received during the second time that is shared between a plurality of wireless communications devices including the wireless communications device, the wake-up signal comprises the first pseudo-random noise sequence, and the at least one selected subcarrier is uniquely assigned to the wireless communications device, the wake-up receiver being further configured to:
determine a correlation of the detected signal to the first pseudo-random noise sequence of the wake-up signal;
compare the correlation to a pre-determined threshold level; and
determine that the detected signal is the wake-up signal if the correlation exceeds the pre-determined threshold level and, in response, wake up the primary receiver.

* * * * *